(12) United States Patent
Kulas

(10) Patent No.: US 8,285,121 B2
(45) Date of Patent: Oct. 9, 2012

(54) DIGITAL NETWORK-BASED VIDEO TAGGING SYSTEM

(75) Inventor: Charles J. Kulas, San Francisco, CA (US)

(73) Assignee: Fall Front Wireless NY, LLC, Dover, DE (US)

( * ) Notice: Subject to any disclaimer, the term of this patent is extended or adjusted under 35 U.S.C. 154(b) by 1096 days.

(21) Appl. No.: 11/868,522

(22) Filed: Oct. 7, 2007

(65) Prior Publication Data

US 2009/0092374 A1    Apr. 9, 2009

(51) Int. Cl.
*G11B 27/00* (2006.01)
*H04N 5/93* (2006.01)
*G06F 7/00* (2006.01)
*H04N 5/92* (2006.01)
*H04N 5/84* (2006.01)
*H04N 5/89* (2006.01)

(52) U.S. Cl. ........ 386/278; 386/326; 386/332; 386/336; 707/609; 707/610; 707/622

(58) Field of Classification Search .................. 386/278, 386/326, 332, 336; 707/609, 610, 622, 912, 707/913, 914, 917
See application file for complete search history.

(56) References Cited

U.S. PATENT DOCUMENTS

| | | | |
|---|---|---|---|
| 5,734,862 A | 3/1998 | Kulas | |
| 6,005,636 A | 12/1999 | Westerman | |
| 6,021,491 A * | 2/2000 | Renaud | 713/179 |
| 6,219,839 B1 | 4/2001 | Sampsell | |
| 6,282,713 B1 | 8/2001 | Kitsukawa et al. | |
| 6,289,165 B1 | 9/2001 | Abecassis | |
| 6,424,370 B1 | 7/2002 | Courtney | |
| 6,546,405 B2 | 4/2003 | Gupta et al. | |
| 6,580,870 B1 | 6/2003 | Kanazawa et al. | |
| 6,701,064 B1 | 3/2004 | De Haan et al. | |
| 6,757,675 B2 * | 6/2004 | Aiken et al. | 1/1 |
| 6,816,189 B2 * | 11/2004 | Nagaoka et al. | 348/231.2 |
| 7,133,837 B1 | 11/2006 | Barnes, Jr. | |
| 7,487,112 B2 | 2/2009 | Barnes, Jr. | |
| 7,490,089 B1 * | 2/2009 | Georgiev | 1/1 |
| 2003/0161615 A1 * | 8/2003 | Tsumagari et al. | 386/95 |
| 2004/0098754 A1 | 5/2004 | Vella et al. | |
| 2004/0107439 A1 | 6/2004 | Hassell et al. | |
| 2004/0126085 A1 | 7/2004 | Braun et al. | |
| 2004/0133661 A1 * | 7/2004 | Yoon et al. | 709/219 |
| 2005/0013208 A1 * | 1/2005 | Hirabayashi et al. | 369/27.01 |
| 2005/0031315 A1 | 2/2005 | Kageyama et al. | |
| 2005/0191041 A1 | 9/2005 | Braun et al. | |
| 2005/0201725 A1 | 9/2005 | Braun et al. | |
| 2005/0213946 A1 | 9/2005 | Braun | |
| 2005/0234958 A1 | 10/2005 | Sipusic et al. | |
| 2005/0262542 A1 | 11/2005 | DeWeese et al. | |
| 2006/0150100 A1 | 7/2006 | Braun et al. | |
| 2006/0242178 A1 | 10/2006 | Butterfield et al. | |

(Continued)

OTHER PUBLICATIONS

U.S. Appl. No. 11/499,315, filed Aug. 4, 2006.

(Continued)

*Primary Examiner* — Daquan Zhao

(57) ABSTRACT

A system for handling video tags. The tags are displayed synchronized to a video. A controller manages and modifies tag data that can be created by one or more users. The controller identifies a tag dataset for use with a video and provides information for synchronization and display of the tags. In a particular embodiment, features of a social-network website implementation are disclosed whereby a user community can post, filter, rate and display tags.

19 Claims, 13 Drawing Sheets

U.S. PATENT DOCUMENTS

| | | |
|---|---|---|
| 2007/0021211 A1 | 1/2007 | Walter |
| 2007/0294622 A1 | 12/2007 | Sterner et al. |
| 2008/0031590 A1 | 2/2008 | Kulas |
| 2008/0046956 A1 | 2/2008 | Kulas |
| 2008/0068500 A1 | 3/2008 | Krause |
| 2008/0154908 A1 | 6/2008 | Datar et al. |

OTHER PUBLICATIONS

U.S. Appl. No. 11/868,524, filed Oct. 7, 2007.
U.S. Appl. No. 11/562,965, filed Nov. 22, 2006.
U.S. Appl. No. 11/677,573, filed Feb. 21, 2007.

* cited by examiner

DIGITAL NETWORK-BASED VIDEO TAGGING SYSTEM

CROSS-REFERENCE TO RELATED APPLICATIONS

This application is also related to co-pending U.S. patent application Ser. No. 11/499,315 filed on Aug. 04, 2006, entitled "DISPLAYING TAGS ASSOCIATED WITH ITEMS IN A VIDEO PLAYBACK.," which is hereby incorporated by reference as if set forth in this application in full for all purposes.

This application is also related to co-pending U.S patent application Ser. No 11/868,524, filed on Oct. 07, 2007, entitled "USER INTERFACE FOR CREATING TAGS SYNCHRONIZED WITH A VIDEO PLAYBACK," which is hereby incorporated by reference as if set forth in this application in full for all purposes.

BACKGROUND OF THE INVENTION

Playback of video on digital networks such as the Internet is becoming more prevalent. In addition to viewing digital video, some sites allow users to post comments about the video in a bulletin board, "blog," chat, email or other web page-based format. For example, social networking sites typically allow viewers of a video to post their comments on a web page from which the video can also be viewed. The comments can be displayed in reverse chronological order (most recent first) in a list below the video. Once a viewer has watched the video the viewer can then read the comments and add a new comment, if desired.

Commercial sponsors or other third parties may have a desire to advertise or otherwise provide information in association with a video. Such ads typically include text or images placed near the video such as commercial text, banner ads, images, etc. In some cases, the advertisements may appear for a short time before the video is allowed to play. Or the advertisements may be placed in a small region along the bottom of the video or adjacent to the video while the video is playing. Typically, these advertisements are created by an ad agency and integrated with the video or with a web page that hosts playback of the video.

Although these approaches allow some user and third-party participation to communicate about, or in association with, video content, such communication is limited.

DETAILED DESCRIPTION OF EXAMPLE EMBODIMENTS

A preferred embodiment of the invention allows additional information to be presented in synchronization with playback of a video. Tag information includes visual information such as text, images, symbols, etc., and other types of information such as animation or behavior, audio, links to network locations or objects, etc., that is not included in an original video to which the tags are applied. The tag information can be synchronized to appear at specified times and places in the video and exhibit predetermined behavior when the video is presented to a user. For example, one type of tag can identify items in a video scene, as described in the related patent applications referenced above. Tag datasets are associated with a video by an identification process and can be created, edited and maintained separately from associated videos. A synchronization process maintains the desired tag presentation when playback of a video is modified with standard video transport controls.

In an example embodiment, a tag controller manages tag datasets that can be modified by one or more users. Users can create, delete or modify tags and specify how the tags are synchronized to a video. The tag controller's functions can include, for example, prohibiting or filtering information, replacing or adding information, or otherwise modifying the user-created information. The tag controller can perform such functions to ensure that undesirable user-generated content is not provided to other users. The tag controller can also allow third-party information to be included in addition to or in place of user content where it is determined appropriate, or merely desirable, to include such third-party information. In a particular embodiment, network linking to objects or locations (i.e., "hyper-linking") passes through a central controller so that user behavior (e.g., clicking on a link, visiting a website, making a purchase etc.) can be monitored or controlled and used for further purposes.

Various embodiments are described including a web-based social network. The social network website embodiment allows a community of users to generate and modify tags on selected videos for purposes of providing user discussion; commercial or informational speech; educational or entertaining dialogue, etc.

Associating a Tag Dataset with a Video

Figure 12:
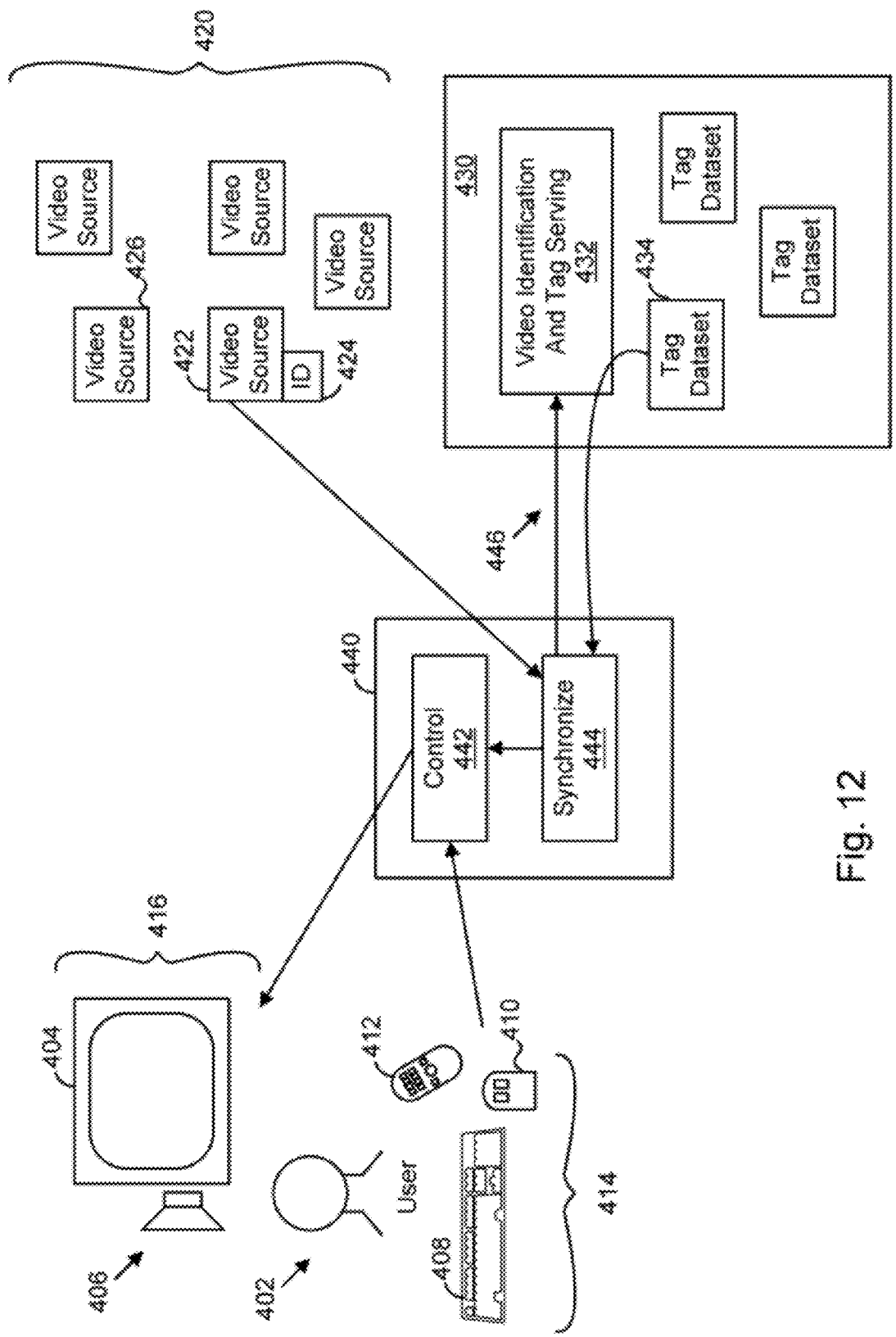
FIG. 12 illustrates a system for associating a tag dataset to a video and for synchronizing additional content included in the tag dataset with playback of the video.

FIG. 12 illustrates a system for associating a tag dataset to a video and for synchronizing additional content included in the tag dataset with playback of the video. A particular video source can be selected from a collection of multiple video sources 420. One or more tag datasets from tag dataset collection 430 is identified for association with the selected video. The tag dataset includes additional content for presentation in synchronization with the video playback to user 402 via playback engine 440, also referred to as processing system 440, or simply process 440.

FIG. 12 shows user 402 provided with output devices such as display 404 and speaker 406. Display 404 and speaker 406 are used to present image and audio information to the user 402 as, for example, during the presentation of digital video content. The digital video content may be any sequence of images displayed to a viewer to create movement or motion as is known in the art. Any video, movie or animation format (e.g., Motion Picture Experts Group (MPEG), Audio Video Interleave (AVI), Adobe video formats such as FLV, motion JPEG, etc.) can be employed. Any type of suitable delivery method may be used such as playing back from a local or remote file, file streaming, etc. Although embodiments of the invention are discussed primarily with respect to digital video formats and delivery, other formats or approaches for displaying information may also benefit from embodiments discussed and claimed herein such as analog transmissions, computer rendered (so-called "machinima") content, animation formats such as Adobe Flash™ SWF file formats, Microsoft™ Sparkle and Silverlight formats, etc.

User 402 is also provided with one or more user input devices 414 such as keyboard 408, mouse 410, remote control 412, etc. In general, any suitable type of user input mechanism may be employed unless otherwise noted. User input signals and presentation output signals are controlled by control 442 within playback engine 440. Functions performed by playback engine 440 may be, for example, performed by processes within a device such as a personal computer, personal digital assistant (PDA), a cell phone, email device, music player, or other presently known or future-developed processing device with sufficient presentation (e.g., display, audio) and user input (if needed) capabilities. Playback engine functionality can also be provided in other ways such as within or in cooperation with a web page browser, provided by a remote device or process via a network, etc.

In some embodiments, presentation of audio information alone, without visual tag content, may benefit from features of the invention. In applications where visual display is used, any type of display mechanism may be used. For example, display goggles, projected images, multiple display screens, television screens, or other displays may be employed.

Processing system 440 can include typical processing components (not shown) such as a processor, memory, stored instructions, network interface, internal bus, etc. Processing system 440 includes synchronization function 444 which synchronizes tag data such as tag dataset 434 with a video source such as video source 422.

A video source such as video source 422 may be one of many video sources 420 such as a video file stored locally (e.g., on a user's device) or stored remotely, such as on a server or other computer system connected to process 440 via a digital network such as the Internet. The video source can be controlled by another entity such as an individual or corporate owner or other or managing entity. Intermediaries may be involved in providing the video content to process 440. For example, an Internet Service Provider (ISP), web hosting company, database manager, etc., may be included in the control or transfer of video information. Some example embodiments that discuss specific entities and transfers are described in more detail, below.

A video source can be selected by user 402 via a user input control or devices 414. Or the video source can be provided automatically. Once selected or provided, synchronize process 444 identifies the video source or content. Several methods of identification are possible and are discussed below.

A first identification method uses an identification (ID) value. A video source (e.g., video file, stream, channel, torrent, etc.) can include an ID value as part of its file contents. In FIG. 12, video source 422 is shown having ID value 424. The ID value 424 is then used by synchronize function 444 to generate request 446 to a system such as tag server 430. Tag identification function 432 within tag server 430 identifies tag dataset 434 as being associated with video source 422. This can be by using ID value matching via a table, index, pointer, another ID value in tag dataset 434, or by using any other suitable association mechanism to identify tag dataset 434 as being associated with ID 424 and, hence, video source 422.

The format and type of ID value 424 and manner of association with the video source 422 can vary in other embodiments. A simple numeric or alphanumeric value can be used or the value can include a symbol, uniform resource locator (URL) or other address value, index, variable, array, object, structure, etc. The ID can be attached to or embedded within a video file, stream, channel or other video source, such as by including it in a header, layer, metadata, etc. In other embodiments, an ID can be associated with a video source via an external table, database or other construct that associates an ID with a video source. Other approaches are possible.

A second identification does not require that a predetermined ID value be used but, instead of or in cooperation with an ID, if present, derives identification information from existing video source information. For example, a name for a video file or stream can be used as an identifier. The name can be a plain text name that is used as a listing in a directory structure used by humans or automated processes, or it can be an encoded or digital binary or other symbolic identifier such as an index or ID generated by other processes for other purposes such as where a web site hosts many different video clips and uses an identification scheme to track each hosted video clip.

Another way to derive identification information is to use file content or video content values as identifiers. In one embodiment, one or more values used by or associated with a video source for any other purpose such as a sequence number, author or originator information, checksum, video pixel values, etc. can be used to help identify the video. Two or more values can be combined to derive a hash or identification value. In a particular embodiment a size of a video file is used to determine multiple video content values to combine to derive an ID. A predetermined number of video content values are obtained starting from the start of the video source contents (i.e., beginning of compressed pixel value data). For example, the $0^{th}$, $1024^{th}$, $2048^{th}$, and so on up to a sample number of word values of video content are used where each sample value is separated by an adjacent sample value by a separation interval of 1024. Each sample value can be added to the running total to derive the hash value. Other ways to obtain a hash value using one or more sample values (e.g., hash table, hash function, etc.) are possible. Another embodiment uses a separation interval that is based on the total video file size, or total video content information size in order to generate a hash that traverses essentially all of the video file or content.

Depending upon the embodiment it may be useful to generate an ID based on less than all of the video file or content as, for example, where a tag dataset may be desired to be used for a video that varies slightly from an original video to which the tag dataset belongs. Different manual or automated processing may change a video's content information or file information slightly. For example, header information may be changed by processes when the video is stored at a specific location, transferred in a peer-to-peer network, etc. A human may make edits to a video such as to remove frames from the video, add an effect or credit, change the audio, etc. The edited video may still be suitable for use with the original tag dataset depending upon the degree of change. In order to accommodate slight variances, a video source identification can be statistical rather than determinative. For example, by requiring that only a threshold number (e.g., 80%) of the sample values match with expected values in order to make the video file association a tag dataset that might not otherwise match could still provide suitable useful in a presentation.

A third identification method allows a user or process to select a tag dataset to be used with a particular video source. For example, a user can be asked to enter a name of a tag dataset to use, or to select a tag dataset from a list. In this manner a user can force use of a particular tag dataset in connection with playback of an arbitrary video. This may be useful where a video is similar to another video but different enough that an automated correlation is difficult. Or it may be useful to have a tag dataset's information displayed without requiring a specific correlation between the tag dataset and the video. For example, a process may use a default tag dataset, or a user may wish to view an arbitrary tag dataset with a specific video. A default tag dataset can inform the viewer that a correlating tag dataset was not discovered for the video. Additional information such as how to locate a corresponding dataset, or how to locate a better version of the video, can be provided, along with ads, user instructions or other information.

Once a tag dataset has been provided to synchronize function 444 the tags defined by the dataset are displayed in synchronism with video playback. Control function 442 can include standard video transport functions such as Play, Pause, Stop, Rewind, Move to Frame, etc., as desired. Synchronize function 444 acts to maintain predetermined tag display, animation and behavior with video playback.

Although specific devices and architectures for performing functions according to embodiments of the invention are described, in general, the functions may be performed by any device or process at any location or time, as desired, unless otherwise noted. For example, the functions of playback engine 440 may be performed by an end-user device such as a computer or cell phone. However, in other embodiments, either or both of the synchronize and/or control functions can be performed by a remote device (e.g., a server, peer or host computer) over a network. Tag identification can be performed in whole or in part on a user's device or on a different local or remote device. Unless otherwise stated, any suitable hardware and/or software can be used to implement the functions described herein. Functions can be performed in parallel or serial, processed in real time or non-real time by hardware, software or a combination of both, as desired.

Multi-User Networked Embodiment with Centralized Control

Multiple users can make modifications to a tag dataset that is associated with a particular video. The modified tag dataset can then remain associated with the particular video so that when the particular video is selected the modified tag dataset is used to provide tag information for synchronized display. For example, a first user can view a particular video that is associated with an original tag dataset that includes tags that are displayed during playback of the particular video. A tag authoring system can be used so that the first user can add, delete or otherwise modify tag information in the original tag dataset. The original tag dataset is then modified accordingly to include the first user's modifications to produce a modified tag dataset.

A second user can then choose to view the particular video. The second user is provided (via a system as described, e.g., in FIG. 12) with the modified tag dataset. The second user can perform additional tag modifications to the modified tag dataset to produce an additionally modified tag dataset that can be stored and provided to subsequent viewers of the particular video.

Modifications to the tag dataset can be performed in real time so that shortly after a user posts a new tag onto a video that new tag appears when another user views the video at about the same time in the video where the tag was posted. Alternatively, updates to a tag dataset can be performed at a scheduled time, or after the tag modifications have undergone review or approval by a controlling entity such as an entity managing tag dataset collection 430. In a preferred embodiment, a user who is authoring changes to a tag dataset can view the changes and then decide to publish the changes so that the changes become available to other users. A tag dataset controlling entity or system (i.e., "tag controller") can determine whether to allow one or more of the changes or to perform substitutions or additional modifications, filtering, adjustment, tracking or other manipulations in response to the user's changes. For example, a tag controller can provide sponsored ads or other third party information based on knowledge obtained from user-generated tag information. Details of controller actions are described below.

Figure 1:
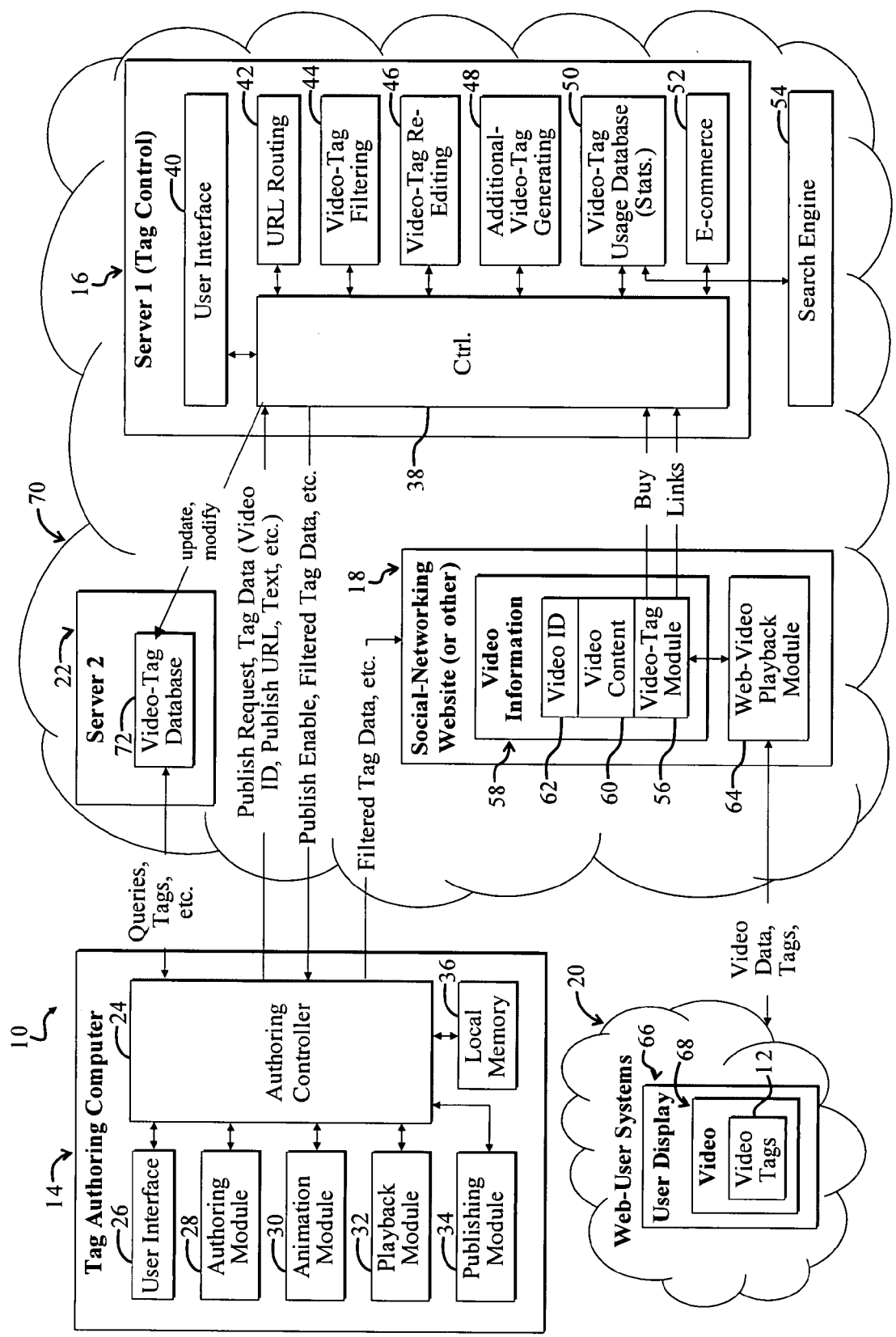
FIG. 1 illustrates a first example video-tag-handling system based on a social networking site.

FIG. 1 illustrates an example video-tag-handling system 10 in a specific application that uses a social networking site and a controlling entity for authoring, animating, playing, publishing, and tracking video tags 12. The video tag design and behavior are defined by one or more tag datasets that are used in the playback of an associated video. The video-tag-handling system 10 includes a tag-authoring computer 14 in communication with a first server 16, a second server 22, and a social-networking website 18. The social-networking website 18 further communicates with various Web-user systems 20 and the first server 16. The first server 16 performs the functions of the tag controller. The first server 16 may be employed by a controlling entity to implement one or more controller methods to control or track tag information for commercial, educational, entertainment or other purposes.

For clarity, various well-known components, such as power supplies, computer networking cards, Internet Service Providers (ISPs), firewalls, anti-hacking tools, and so on, have been omitted from the figures. In addition, various conventional controls, such as controls for closing interface screens, minimizing windows, and so on, are omitted. However, those skilled in the art with access to the present teachings will know which components and features to implement and how to implement them to meet the needs of a given application. Furthermore, the figures are not necessarily drawn to scale.

The tag-authoring computer 14 includes an authoring controller 24 in communication with a user interface 26, an authoring module 28, an animation module 30, a playback module 32, a publishing module 34, and a local memory 36.

The authoring controller 24 communicates with a tag controller 38 running on the tag server 16, i.e., the second server 16. The tag server 16 further includes an administrator interface 40, a URL routing module 42, a video-tag filtering module 44, a video-tag re-editing module 46, an additional-video-tag generating module 48, a video-tag usage database 50, and an e-commerce engine 52, which all communicate with the tag controller 38. Search engine 54 is shown communicating with the video-tag usage database 50 and can be used to quickly obtain usage data according to criteria such as conditions specified by a relational search query.

In the present specific embodiment, the tag controller 38 further communicates with a video-tag module 56 running on the social-networking site 18. The social-networking website 18 can be a site where videos are accessed by multiple users, such as Myspace.com, YouTube.com, or Facebook.com. For the purposes of the present discussion, a social-networking site or website may be any website adapted to enable users to interact or communicate with each other. It should be apparent that other types of websites, applications or other hosts can be provided with video tagging functionality described herein.

For illustrative purposes, the social-networking website 18 is shown maintaining video information 58, including video content 60 to be published. Publishing of the video content 60 by the social-networking website 18 enables access to the video content 60 by the Web-user systems 20. The video information 58 further includes video identification information (video ID) 62 and the video-tag module 56. The video-tag module 56 may include computer code for selectively retrieving video-tag information from the tag server 16, as discussed more fully below. An additional Web-video playback module 64 facilitates user access to the video-content 60 by the Web-user systems 20.

The Web-user systems 20 may include various computers owned by various users or viewers. The Web-user systems 20 act as clients to one or more servers hosting the social-networking website 18. For illustrative purposes, the Web-user systems 20 are shown including a user display 66 that is adapted to play a video 68 with video tags 12, where the video content may be downloaded, streamed, or otherwise obtained from the social-networking website 18.

The second server 22, which may be implemented via one or more computers or servers, includes a video-tag database 72. The video-tag database 72 is accessible to the authoring module 28 via the controller 24 of the tag-authoring computer 14. In the present embodiment, the tag-authoring computer 14 employs an Internet connection to communicate with the social-networking website 18, first server 16, and second server 22, which are included in or connected to the Internet 70. Similarly, the Web-user systems 20 communicate with the social-networking website 18 via the Internet 70.

Although the example architecture is described with respect to server-client transactions, such terminology is generally adopted for ease of discussion and not to limit the types of transactions that can be performed. Other suitable architectures may be employed, as desired. For example, a less centralized (i.e., more distributed) system can use multiple processing devices or sites to perform the functions included within server one of FIG. 1.

In an example operative scenario, a user employs the user interface 26 to employ video-tag authoring functionality provided by the authoring module 28. The functionality includes authoring controls for enabling the user to edit text, links, color, transparency, shape, and other properties associated with a video tag. For the purposes of the present discussion, authoring controls may be any user-interface features and/or instructions associated therewith for enabling a user to trigger, activate, or otherwise use predetermined instructions.

Tag Authoring User Interfaces

The user may import various default video tags from the video-tag database 72 via the authoring controller 24 in response to predetermined user input, such as activation of an import control such as a drop-down menu that allows selection of a tag design or style. An imported tag may be edited via functionality provided by the authoring module 28 and made accessible to the user via the user interface 26 and controller 24.

Alternatively, the user may employ the user interface 26 and routines running on the authoring module 28 and/or authoring controller 24 to create an entirely new video tag. The new video tag may then be saved to the publicly accessible video-tag database 72 running on the second server 22. Alternatively, the user may store the newly generated tag or a modified default tag in the local memory 36.

The user may optionally control animation behavior of the video tag by invoking functionality provided by the animation module 30 via the user interface 26 and authoring controller 24. Controlling video-tag animation behavior includes, but is not limited to controlling the translational movement of a video tag with respect to the associated video being played back. For the purposes of the present discussion, the term "animation behavior" may be any characteristic associated with movement of a video tag. For example, the time interval(s) in which the video tag appears in a video and coordinates indicating different video-tag positions in the video at different times represent characteristics describing animation behavior.

The user may employ the user interface 26 to invoke playback functionality provided by the playback module 32 to see how an authored tag moves relative to a displayed video. The playback module 32 may also include one or more routines for enabling a user to view other videos that have accompanying video tags therein.

The user may employ the user interface 26 to invoke functionality implemented via the publishing module 34. In the present specific embodiment, the publishing module 34 includes one or more routines enabling the user to publish a video with video-tags associated therewith, or alternatively, to publish video-tags in, on, or associated with a pre-existing video that may have been created or stored by the tag author or by another person or process. For example, a tag author may create tag information for a video that exists on a remote site, such as the social-networking website 18.

In the present illustrative operative scenario, a user employs the user interface 26 to author and animate one or more video tags to be published with a video that is associated with the video content 60 on the social-networking website 18. When the user decides to publish the video tags, the user employs the user interface 26 to activate functionality provided by the publishing module 34. When the user selects a publishing option, a publish request, along with proposed video-tag data to be published is automatically forwarded to the tag server 16. The video-tag data includes video-identification information (video ID), which identifies the video to be published. The video-tag data also includes other video-tag information associated with the one or more video tags to be published. The other video-tag information may include author information, video-tag content, such as text to be included in the video tag, one or more hyperlinks, video-tag display properties, temporal and spatial locations of video tags relative to displayed video content 60, and so on.

For the purposes of the present discussion, video tag content may include any properties and/or characteristics associated with a video tag, including text content, hyperlinks, shape, color, positioning, animation characteristics, and so on.

A temporal location of a video tag may be any point in time relative to a video playback at which an instance of the video tag occurs. An example point in time may be identified by a video frame number or other temporal parameter. A spatial location of a video tag may be identified in terms of pixel coordinates associated with a display, such as a video display. A preferred embodiment of the invention uses a reference location either in the video playback area, or in a web page or display area that hosts the video playback area.

In other embodiments, any suitable reference location can be used. Tags can be allowed to move outside of the video display area in order to provide information and selections in an independent area so that tags can be manipulated apart from the video content, if desired. Such an approach is described in the co-pending applications referenced, above.

In addition, a publishing URL is also forwarded to the tag server 16. For the purposes of the present discussion, a publishing URL may be any information, such as address information, indicating where a video tag and accompanying video is to be published. In the present operative scenario, the publishing URL corresponds to the location of the video to be tagged with video tags on the social networking website 18.

The tag controller 38 can invoke functions such as those represented by video-tag filtering module 44, video-tag re-editing module 46, and additional-video-tag generating module 48, to make adjustments to video-tag information to be published based on one or more predetermined criteria. An administrator of the tag server 16 may specify the one or more predetermined criteria via the admin interface 40. Example criteria include the existence of swear words in video tag information to be published to certain websites. For example, the video-tag re-editing module 46 may activate one or more routines for deleting swear words from video tag text to be published to a website that does not allow swear words in commentary.

As another example, the video-tag filtering module 46 may delete certain types or categories of video tags that are not authorized by a video copyright holder to appear in a particular video.

The additional-video-tag generating module 48 may implement one or more routines for adding additional video tags to the video associated with the video ID. For example, text in the video-tag information provided by the tag-authoring computer 14 may reference a particular item, such as a car, appearing in the identified video at a particular temporal location in the video. The additional-video-tag generating module 48 may then automatically insert a video tag advertising a car near the temporal location at which the original video tag occurs in the identified video. Criteria for implementing such advertisement placement may be incorporated in the tag controller 38 or other module, and may be edited by a user of the tag server 16 via the administrator interface 40.

In the present specific embodiment, after the video-tag information provided by the tag-authoring computer 14 is selectively filtered, adjusted, and/or augmented via the tag server 16, the tag server 16 sends an enable signal to the tag-authoring computer 14, along with filtered, adjusted, and/or augmented video-tag data. The authoring controller 24, in communication with the publishing module 34, then publishes the resulting adjusted video-tag data to the social networking website 18. This enables display of video tags associated with the adjusted video-tag data along with the identified video. The authoring computer 14 may transfer the adjusted video-tag data along with the video ID 62 to the social networking website 18 to facilitate publishing after publishing is enabled by an enable signal from the tag server 16.

In the present specific embodiment, the tag-authoring computer 14 also transfers video-tag data comprising the video-tag module 56. The video-tag module 56 includes one or more routines that instruct the social-networking website 18 as to how to render the video-tags in, on, or adjacent to the video content 60. The video-tag module 56 further includes instructions for redirecting links occurring in video tags to the tag server 16. The tag controller 38 may employ the URL routing module 42 to then cause the site identified by the URL occurring in a particular video tag to be displayed by the user display 66. This enables the tag server 16 to track user selected video-tag links and to compile additional usage statistics, which are stored in the video-tag usage database 50. In addition, the video-tag module 56 may forward a signal to the tag controller 38 each time the video content 60 and accompanying tags provided via the video-tag module 56 are played. This enables the tag server 16 to count numbers of video-tag plays, which may be stored in the video-tag usage database 50 for future use.

In addition, the video-tag module 56 includes one or more instructions for directing user requests to purchase ("buy") items occurring in a video, as identified by one or more video tags, to the e-commerce engine 52 running on the tag server 16. The e-commerce engine 52 may run one or more routines for enabling viewers of the social-networking website 18, such as users of the Web-user systems 20, to purchase products via the tag server 16.

Users of the Web-user systems 20 may activate the Web-video playback module 64 running on the social-networking website 18 to display the video content 60. The Web-video playback module 64 may communicate with the video-tag module 56 to facilitate redirecting user purchase requests and user-selected hyperlinks to the tag server 16. For illustrative purposes, the video-tag content 60 appears as the video 68 with video tags 12. The video-tag content 60 is displayed on the user display 66 of the Web-user systems 20.

In addition, certain video-tag information, such as text and URLs, is stored in the video-tag usage database 50 for statistics computations and for use by the search engine 54. The video-tag usage database 50 may also be employed by the tag controller 38 and one or more of the accompanying tag modules 42-48, 52 to facilitate implementing one or more routines. For example, the tag controller 38 may reference the video-tag usage database 50 to determine whether a particular item appears in a particular video and whether a particular advertisement is suitable for the particular video at a certain location in the video. If a particular type of advertisement is deemed appropriate according to predetermined criteria, the tag controller 38 may activate the additional-video-tag-generating module 48 to create a video-tag advertisement for insertion in to the video.

Hence, the video-tag-handling system 10 represents a feature-rich system that may enable various potentially novel activities, including, but not limited to: 1. Routing tag (video-tag) links back to the remote tag server 16; 2. Filtering tag contents according to publishing location, such as YouTube.com; 3. Adjusting video-tag display priority according to an advertisement fee paid by a user or advertiser; 4. Adjusting tag contents or characteristics according to position in video, according to advertisement payment, or according to other content occurring in video with tag; 5. Placing advertisements, such as video-tag advertisements or other types of advertisements, based on data compiled from one or more user video tags; and 6. Enabling purchases of products or services via a video-tag advertisement or link associated therewith, wherein the purchase can be routed through the remote tag server 16.

Note that various modules 28-34 of the tag-authoring computer 14 and various modules 42-52 of the tag server 16 may activate or be associated with corresponding user interface screens and/or interface controls, which are displayed to users via the user interfaces 26, 40, respectively.

Figure 2:
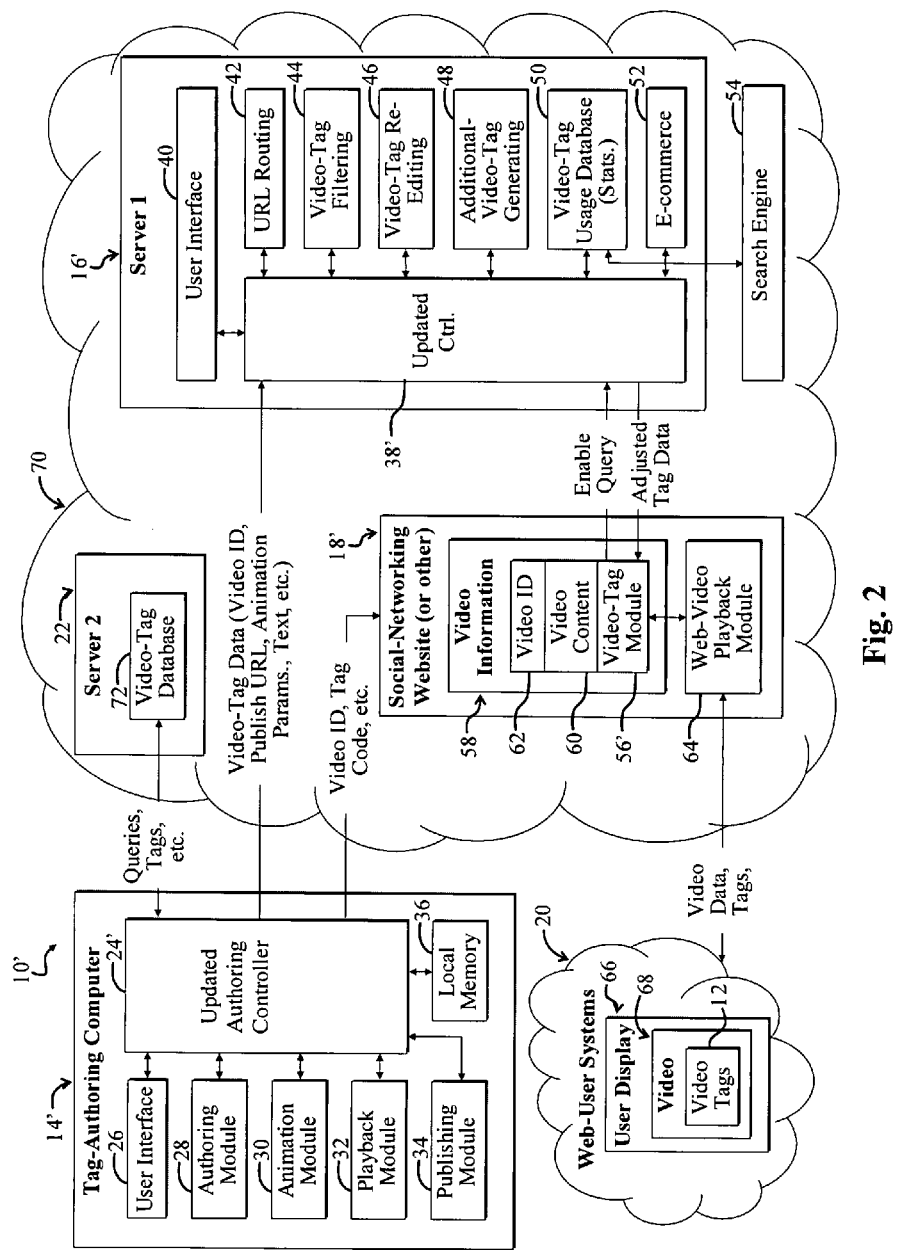
FIG. 2 illustrates a second example video-tag-handling system.

FIG. 2 illustrates a second example video-tag-handling system 10'. The construction and operation of the second example video-tag-handling system 10' is similar to the construction and operation of the first example video-tag-handling system 10 of FIG. 1 with the exception that publishing of video tags is handled differently. The authoring controller 24 of FIG. 1 is replaced with an updated authoring controller 24' in FIG. 2. The tag controller 38 is replaced with an updated tag controller 38' in FIG. 2 to handle an updated publishing scheme.

In particular, when the user of the tag-authoring computer 14' chooses to publish a video tag, the corresponding video-tag data is forwarded to the tag server 16' and the social-networking website 18'. However, unlike the system 10 of FIG. 1, the tag server 16' does not return a publishing-authorization signal directly back to the tag-authoring computer 14' to authorize publishing of video tags on the social-networking website 18'. Instead, video-tag information that is forwarded from the tag-authoring computer 14' to the social-networking website 18' includes additional routines comprising the video-tag module 56' on the social-networking website 18'.

The additional routines 56' are activated via the Web-video playback module 64 when a user of the Web-user systems 20 attempts to play a video that has been tagged via the tag-authoring computer 14'. The additional routines 56' send an enable query to the updated tag controller 38', which identifies video-tag data that was previously sent to the tag server 16' via the tag-authoring computer 14'. The tag controller 38' then automatically invokes functionality provided by the various modules 42-52 of the tag server 16' based on predetermined rules or criteria, to adjust the video-tag data if not already initially adjusted upon receipt by the tag server 16'. Adjusted video-tag data is then forwarded back to the social-networking website 18' along with an enable signal enabling the Web-video playback module 64 to play back video content 60 with the adjusted video-tag data in response to activation by one or more of the Web-user systems 20.

The video-tag-handling system 10' may facilitate tracking additional usage information statistics, such as the number of times a particular video tag is played. Furthermore, note that the tag server 16' may implement one or more routines for limiting the number of plays of a particular video-tag. For example, the tag controller 38' may be employed to limit an advertiser's video-tag to a predetermined number of plays. Such playback limitations may also be implemented via the video-tag-handling system 10 of FIG. 1. However, in the embodiment 10 of FIG. 1, such playback limitations may be encoded in the video-tag data itself. The embodiment 10' of FIG. 2 does not necessarily use playback limitations encoded in video-tag data, but instead, may retain such limitations at the tag server 16', which may disable publishing of a video tag when a predetermined number of playbacks of the video tag is counted.

Figure 3:
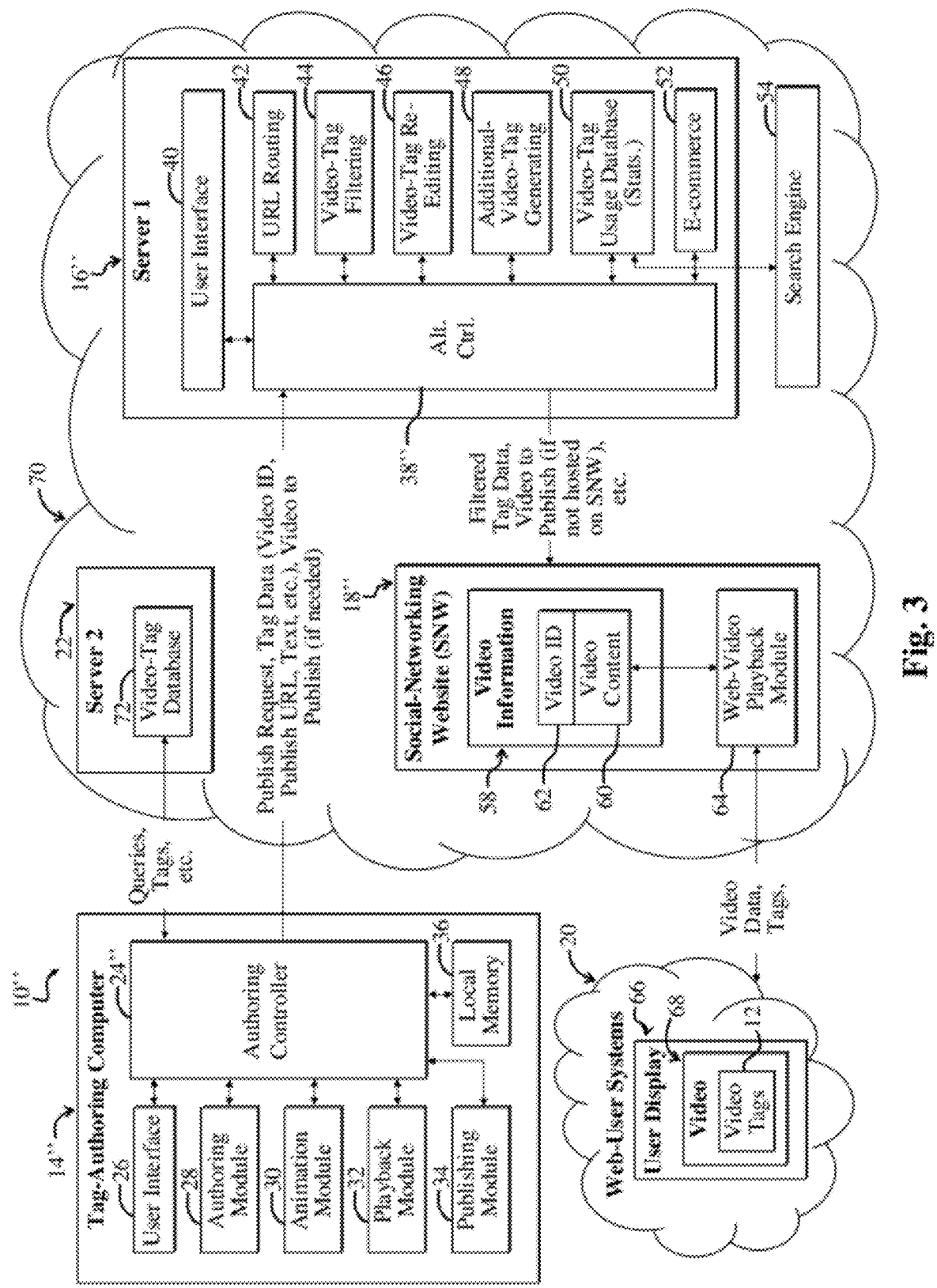
FIG. 3 illustrates a third example video-tag-handling system.

FIG. 3 illustrates a third example video-tag-handling system 10". The construction and operation of the third video-tag-handling system 10" is similar to the construction and operation of the first example video-tag-handling system 10 of FIG. 1 with the exception that publishing of video tags is handled differently. The authoring controller 24 of FIG. 1 is replaced with an alternative authoring controller 24" in FIG. 3, and the tag controller 38 is replaced with an alternative tag controller 38" in FIG. 3 to handle an alternative publishing scheme.

In particular, when a user of the tag-authoring computer 14" chooses to publish a video tag, the corresponding video-tag data, publishing URL, and any video to be published and/or a location thereof (such as a link or other address) is provided to the alternative tag controller 38". The alternative tag controller 38" then selectively adjusts or modifies the video-data as needed and publishes the associated video tags to the website indicated via the publishing URL, which is the social-networking website 18" in the present operative scenario. The tag server 16" may also publish video accompanying the video tags if the video content 60 is not already present on the social-networking website 18". If the video content 60 is already present on the social-networking website 18", the video identification information 62, which may be provided to the social-networking website 18", is used by the tag server 16" and/or social-networking website 18" to associate video-tag data from the tag server 16" with the appropriate video content 60.

Figure 4:
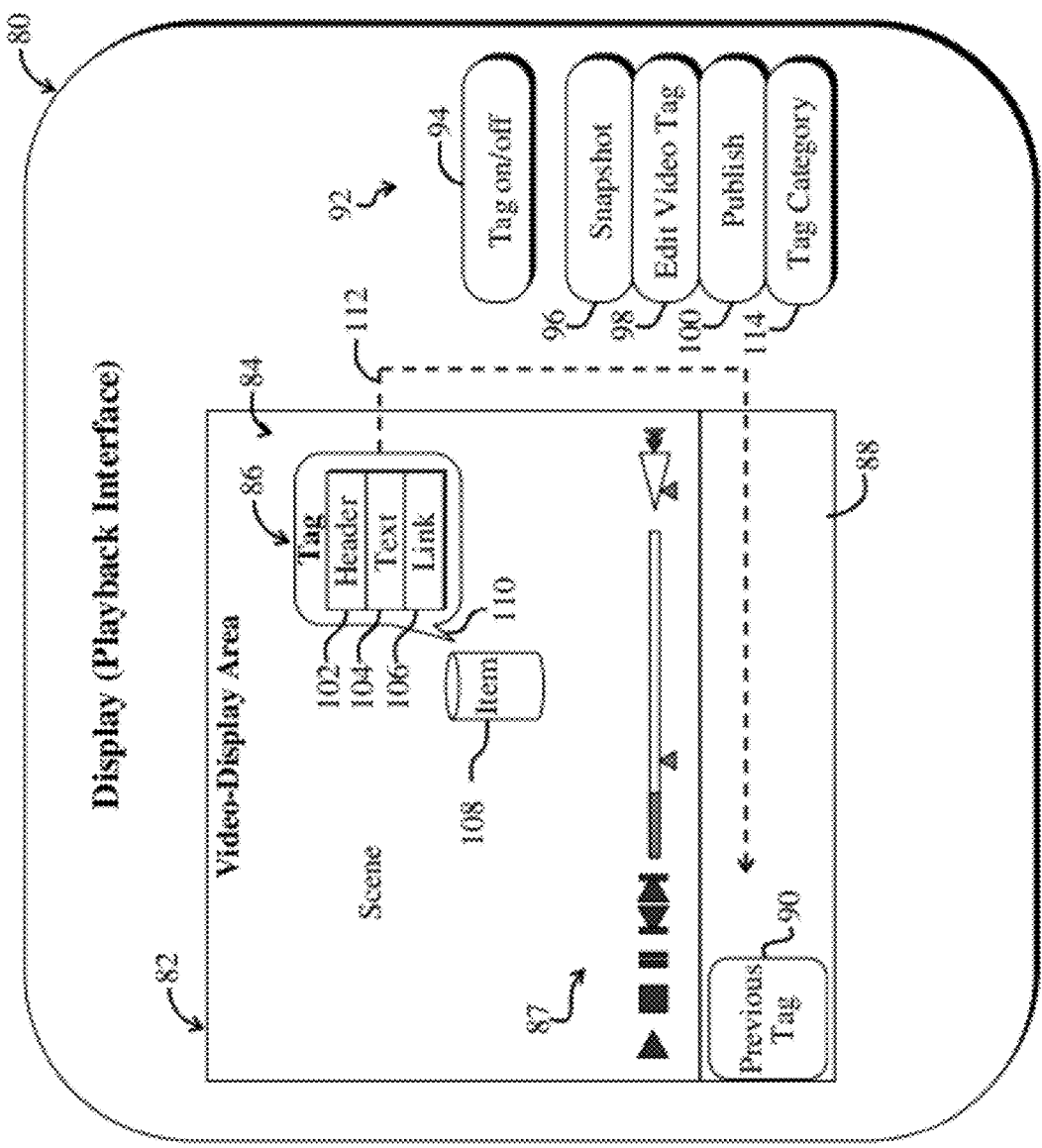
FIG. 4 illustrates a first example video-playback interface suitable for use with the video-tag-handling systems of FIGS. 1-3.

FIG. 4 illustrates a first example video-playback interface 80 suitable for use with the video-tag-handling systems 10, 10', 10" of FIGS. 1-3. With reference to FIGS. 1 and 4, the video-playback interface 80 may be accessible to a user of the tag-authoring computer 14 via the user interface 26. The video-playback interface 80 may be implemented via instructions, such as computer code, included in the playback module 32 of the tag-authoring computer 14. A similar video-playback interface may be displayed on the user display 66 of the user systems and may be implemented via the Web-video playback module 64 running on the social-networking website 18 or running on the Web-user systems 20, such as via a plug-in module.

The present illustrative playback interface 80 includes a video-display area 82 for displaying a scene 84, which may include a video tag 86, also called a tag. The scene 84 may represent a video playing back in real time, a paused video frame, or other image data.

Playback behavior of the video scene 84 is controlled via user controls 87, which may include standard play, stop, pause, fast forward, rewind, and volume controls. In the present illustrative embodiment, the video-display area 82 includes additional space 88 below the scene 84, where tags, such as a previous tag 90, may move after being displayed in the video-display area 82. The playback interface 80 further includes various user controls 92, including a tag on/off control 94, a snapshot control 96, an edit-video-tag control 98, and a publish control 100.

A tag-category control 114 may enable a user to select different tag categories for display. For example, a user may click the tag-category control 114, such as via a computer mouse, which may then cause only tags of a certain category to be displayed. Tag categories can include any desired grouping of tags. For example, tags referring to advertisements might be categorized as advertisement tags. The tag-category control 114 might indicate the tag category currently being displayed. Multiple clicks on the tag-category control 114 may enable a user to page through multiple categories of tags to be displayed. Various controls, such as the tag-category control 114 may be omitted without departing from the scope of the present invention. Furthermore, the tag-category control 114 may operate differently than described. For example, the tag-category control 114 may activate a separate menu for selecting tag display categories or even categorizing or re-categorizing existing tags according to user preference.

In an example operative scenario, the video-display area 82 is shown displaying an example tag 86, which includes a tag header field 102, a tag text field 104, and a tag link field 106. The header field 102 may include the name of the tag's author, category of the tag, and/or other information. The text filed 104 may include tag text, which may be supplied by the user of the playback interface 80 or via another user. Similarly, the link field 106 may include one or more hyperlinks associated with the tag 86. For example, a hyperlink to a website that enables the viewer to purchase an item 108 may be included in the tag-link field 106. The tag 86 further includes a pointer 110, which may be used to point to a particular item or location, such as the item 108, occurring in the video scene 84.

The tag 86 and accompanying fields 102-106, size, pointer 110, spatial location, and so on are merely illustrative. Different sizes, fields, content, and so on may be employed without departing from the scope of the present teachings. For example, the pointer 110 may be omitted.

In one operative scenario, a user is playing a video scene 84 and decides to take a snapshot of the scene 84 by selecting the snapshot control 96. The resulting snapshot includes the tag 86 and scene 84 in a still-frame or in a predetermined number of frames. The snapshot may be stored locally, such as in the local memory 36 of the tag-authoring computer 14. Alternatively, the snapshot may be emailed or may be handled otherwise. A user may then access the snapshot as needed to read the text field 104, select the link 106, and so on.

In another operative scenario, the user is playing back the video scene 84 and then pauses the video at the scene 84. The user then selects the tag 86, such as via a computer mouse or hot-key, and then clicks the edit-video-tag control 98. The playback interface 80 then changes to a tag-authoring interface, as discussed more fully below, enabling the user to edit the tag 86.

Whether or not the tag 86 is editable by the user may depend on predetermined tag settings. For example, the tag 86 may be configured so that only the author of the tag 86 can edit it. Alternatively, the tag 86 may be configured so that any viewer can edit or add comments to the tag 86. The tag on/off control 94 acts as a toggle button to enable a user to turn the display of tags, such as the tag 86, on or off.

In another operative scenario, the user is playing back the video scene 84 and decides to publish the associated video to a website. The user then selects the publish control 100, which may cause the playback interface to change to a publishing interface that provides controls enabling a user to export the video to a website or other media and/or to publish the tag 86 to a website already hosting the video.

In another operative scenario, the user allows the video playing in the video display area 82 to play through. The tag 86 has been configured to follow an animation path 112 to the space 88 below the scene 84 after a predetermined number of video frames. The tag 86 may then rest in the space 88, which may include other tags, and may expire and disappear after a predetermined time period. Alternatively, previously displayed tags 90 are stacked in the space 88 or spread in an overlapping fashion, with the most recent tags being near the top of the stack. Other stack orderings are also possible.

The user playback interface 80 may include additional controls without departing from the scope of the present teachings. For example, a control enabling a user to display only certain tags associated with certain rankings, priorities, authors, and so on, may be included in the playback interface 80. Various additional conventional controls for browsing for video files, importing video files, closing the interface 80, and so on, are not shown. However, those skilled in the art with access to the present teachings may readily implement such controls to meet the needs of a given application without undue experimentation.

Furthermore, while certain controls 92 in the playback interface 80 are shown as buttons, other types of controls may be employed. For example, similar functionality may be implemented via computer keyboard hot keys (e.g., shift-S to take a snapshot), pull-down menus, or menus activated by right-clicking the tag 86 or scene 84. Alternatively, a user may click and drag the tag 86 to a control, such as the edit-video-tag control 98 to activate it, or the user may click and drag the tag 86 to a different interface, such as to a tag authoring or animating interface, as discussed more fully below.

Figure 5:
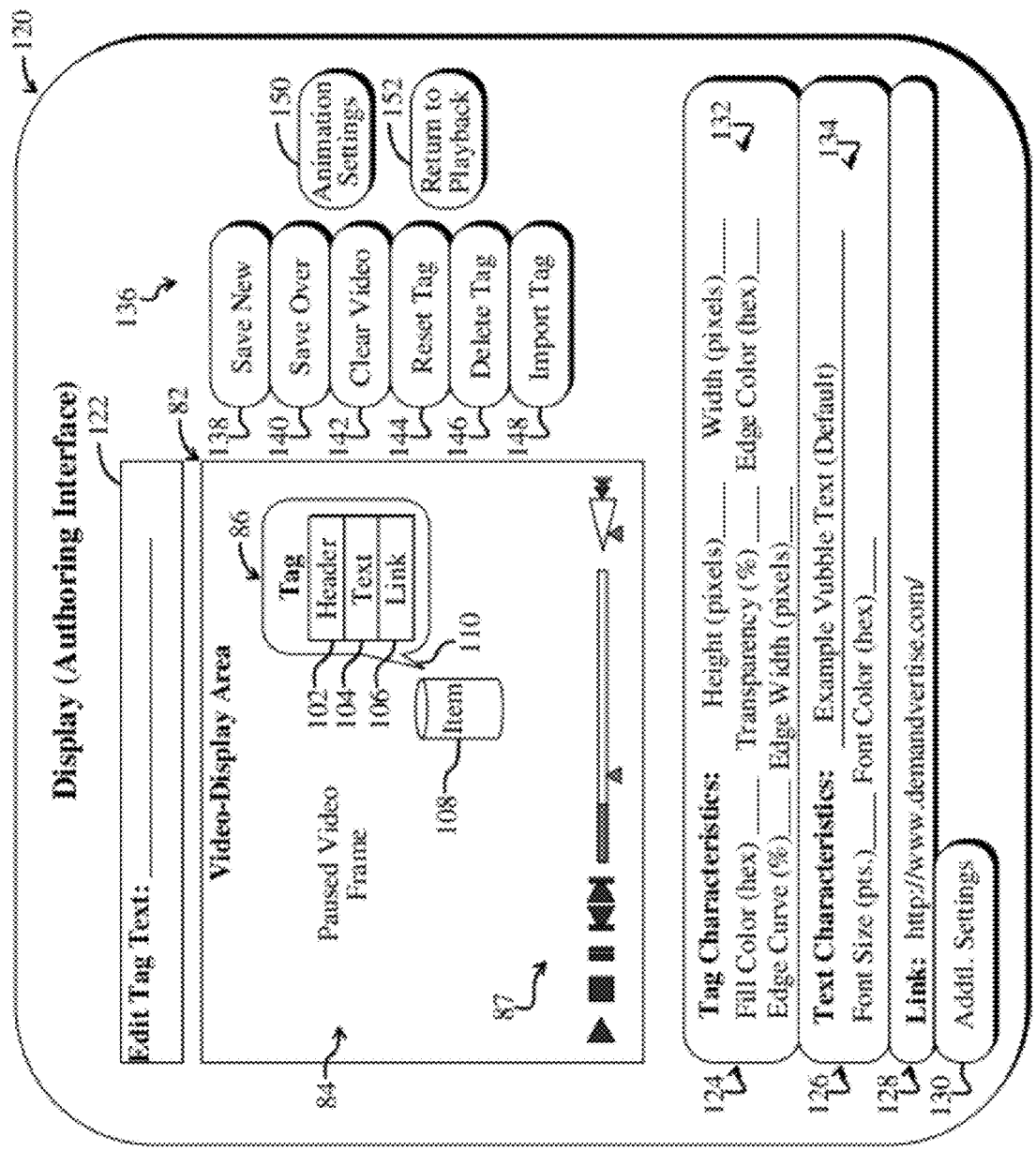
FIG. 5 illustrates a first example video-tag authoring interface that may be activated via the video-playback interface of FIG. 4.

FIG. 5 illustrates a first example video-tag authoring interface 120 that may be activated via the video-playback interface 80 of FIG. 4 when a user selects the edit-video-tag control 98 of FIG. 4. The authoring interface 120 may be implemented via one or more routines running on the authoring module 28 of the tag-authoring computer 14 of FIG. 1.

The authoring interface 120 includes the video-display area 82, which is shown illustrating a similar video scene 84 as shown in the playback interface 80 of FIG. 4, including the tag 86 and item 108 to which it points. The authoring interface 120 further includes a text-editing section 122 in which a user may enter tag text. If the tag 86 is an imported tag, such as a tag template imported from the video-tag database 72 of FIG. 1, default text included in the tag template will appear in the test-editing section 122. A user may then edit the default text.

The authoring interface 120 includes additional authoring sections, including a tag-characteristics section 124, a text-characteristics section 126, and a link section 128. The tag-characteristics section 124 includes various fields 132, wherein a user can adjust the height, width, fill color, transparency, edge color, edge width, and edge curvature of the tag 86 by entering desired values in spaces provided.

The text-characteristics section 126 includes text-characteristic fields 134, wherein a user can adjust the size and color of text appearing in the text field 104. Example tag text with the adjusted colors may appear in the text-characteristics section 126. The link section 128 provides space for a user to enter a hyperlink to appear in the link field 106 of the tag 16.

Additional or fewer fields may be included in various sections, such as the tag-text characteristics section 126 or the tag-characteristics section 124. For example, a field for selecting the type of font used in the tag 86 may be added to the text-characteristics section 126. An additional field may be provided for adding a tag header or other field to the tag 86 or for changing the existing header 102 or properties thereof.

Additional interfaces, menus, and/or controls for adjusting additional tag properties or characteristics may be activated by selecting an additional-settings button 130. Examples of additional controls that may be employed include a control for adjusting a tag category associated with the tag 86, a control for selecting different tag shapes, a control for determining whether the scene 84 is allowed to animate in the authoring interface 120, a control for displaying multiple tags for editing simultaneously, a control for controlling pointer positioning on the tag 86, a control for setting the life span of the tag 86 in terms of the number of plays the tag may experience before expiring or determining how long the tag will remain in a given static location before disappearing or changing transparency, and so on.

For illustrative purposes, various additional controls 136 are shown. The additional controls 136 include a save-new button 138, a save-over button 140, a clear-video button 142, a reset-tag button 144, a delete-tag button 146, an import-tag button 148, an animation-setting button 150, and a return-to-playback button 152.

With reference to FIGS. 1 and 5, user selection of the save-new button 138 activates one or more routines, which may be included in the authoring module 28 of FIG. 1, for enabling a user to save an edited tag. The saved tag may be saved with a new name to a local memory, such as the local memory 36 of FIG. 1, or to the video-tag database 72. User selection of the save-over button 140 may activate one or more routines to cause the edited tag 86 to replace any previously saved or stored version of the tag 86. User selection of the clear-video button 142 may activate one or more routines for clearing instances of the tag 86 or all tags (depending on the additional settings 130) from the video represented by the scene 84. User selection of the reset-tag button may cause the tag 86 to either clear its fields 102-106, return to a default tag, or reset to the previously saved version of the tag 86. User selection of the delete-tag button 146 may cause deletion of the tag 86 or removal of the tag 86 from the scene 84 and associated video. User selection of the import-tag button 148 may cause display of a new tag in addition to the tag 86 or instead of the tag 86. The new tag can then be edited and saved via the authoring interface 120.

User selection of the return-to-playback button 152 may activate one or more routines to cause the authoring interface 120 to transition to or otherwise be replaced by or appear in addition to the playback interface 80 of FIG. 4. Similarly, user selection of the animation-settings button 150 may cause an animation interface to appear, as discussed more fully below.

The authoring interface 120 may enable a user to control certain animation behavior. For example, the tag 86 may change in time over a predetermined number of frames. In one operative scenario, a user employs the playback controls 87 to move to different locations in a video in which the tag 86 will be displayed. At different temporal locations in the video scene 84, a user may then adjust tag display settings, such as transparency and color, at the different locations.

In another operative scenario, the scene 84 is paused. A user may then click on the tag 86 to associate changes entered in the various fields, e.g., fields 124-128 with the selected tag 86. Alternatively, a user may select individual fields 124-128 in the tag 86 directly, such as via a computer mouse. The user may then enter field information, such as text or links, directly into the tag fields 102-106. For the purposes of the present discussion, field information may include any type of information added to a video tag, such as the name the author of the video tag, meta data associated with the video tag, and so on.

To author a new tag or a different tag other than the tag 86, a user may import a preexisting tag, such as from the video-tag database 72 of FIG. 1, or the user may create a new tag. To create a new tag, a user may clear an imported tag by clicking the reset-tag button 144 and then save the tag as a new tag by selecting the save-new button 138. To import a tag, a user may select the import-tag button 148.

Various sections 124-128 and controls 130, 136 may automatically appear in the authoring interface 120 when the authoring interface 120 is activated. Alternatively, such sections and controls may be implemented via tabbed menus, drop-down lists, pop-up menus, menus that are activated via hot keys or right-clicking the tag 86, and so on, without departing from the scope of the present teachings.

Those skilled in the art will appreciate that the positioning of various features of the authoring interface 120, such as the additional controls 136 is merely illustrative. The authoring interface may be arranged differently without departing from the scope of the present teachings. For example, the text-editing section 122 may be positioned below the video-display area 82. Furthermore, more or fewer controls or sections may be included. For example, the video playback controls 87 may be omitted from the authoring interface 120 or may be located outside of the video-display area 82.

Figure 6:
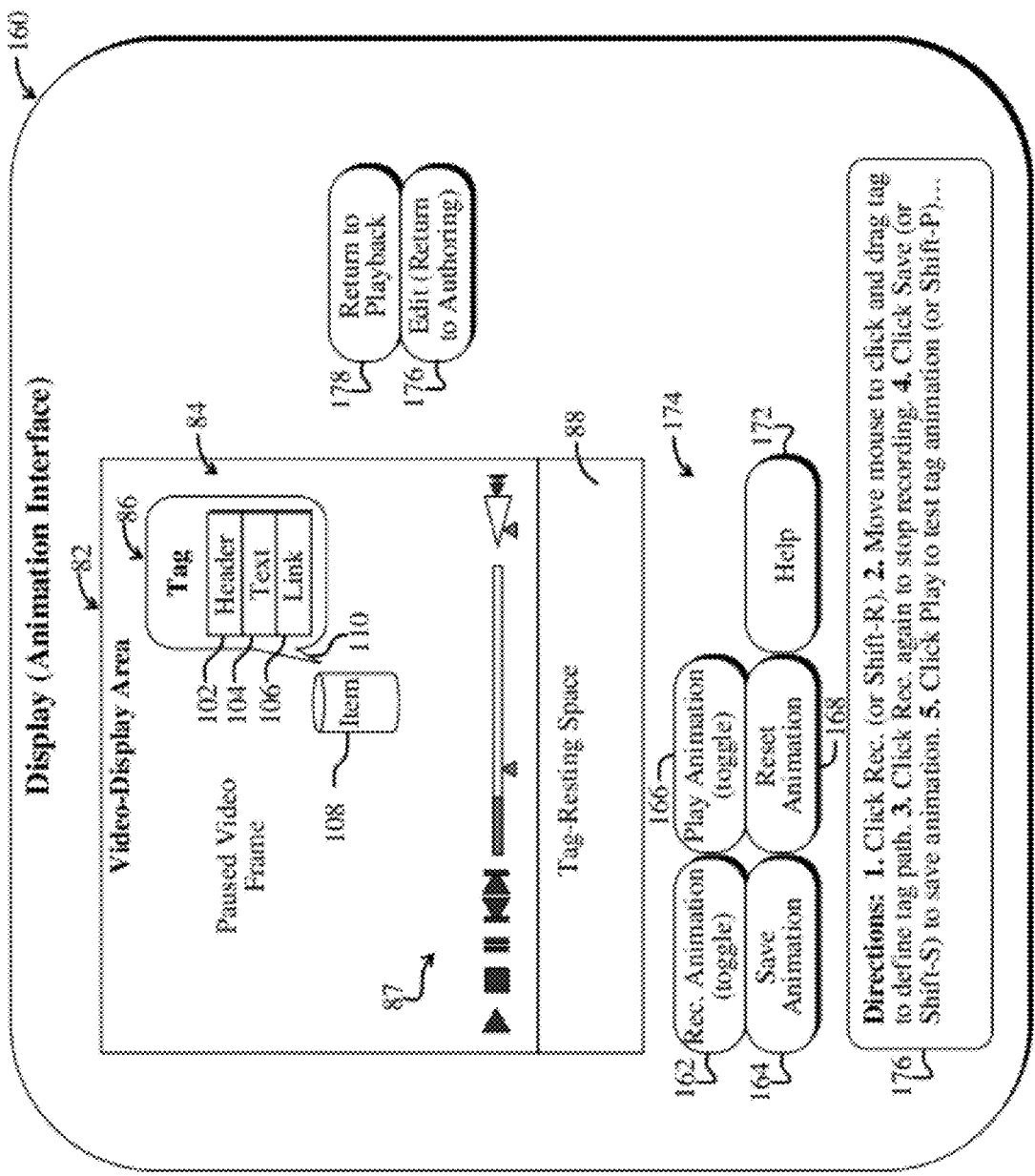
FIG. 6 illustrates a first example video-tag animation interface that may be activated via the video-tag authoring interface of FIG. 5.

FIG. 6 illustrates a first example video-tag animation interface 160 that may be activated via the video-tag authoring interface 120 of FIG. 5 by selecting the animation-settings button 150. The animation module 30 of FIG. 1 may include routines or computer instructions for implementing the animation interface 160 via the user interface 26 of FIG. 1.

The animation interface 160 includes the video-display area 82, which is shown illustrating the scene 84. The playback of the scene 84 may be controlled in part via the playback controls 87 in the video-display area 82. For illustrative purposes, extra space 88 is shown below the video-display area 82. The extra space 88 may result from an unused portion of a display resulting from differences in aspect ratios of displayed video. Alternatively, the extra space 88 may be automatically created irrespective of the aspect ratio of the video being displayed.

The animation interface 160 includes various animation controls 174, including a record-animation button 162, a save-animation button 164, a play-animation button 166, a reset-animation button 168, and a help button 172, for enabling a user to record a tag animation, save a tag animation, play a tag animation, reset a tag animation, or activate a help menu, respectively.

In the present embodiment, directions 176 for using the animation interface 160 are provided below the controls 174. The directions 176 may include hyperlinks to other subjects or more detailed subject matter.

In operation, to record a tag animation, a user selects the record-animation button 162. By default, the scene 84 begins to play while movement of the tag 86 is recorded. A user may click and drag the tag 86, such as via a computer mouse, to control movement of the tag 86 in the animated scene 84.

In an illustrative scenario, with reference to FIGS. 4 and 6, the user selects the tag 86, such as by clicking on it with a computer mouse, and then drags the tag 86 to the side and down into the tag-resting space 88, as indicated by the example animation path 112 of FIG. 4. To stop recording the movement of the tag 86, the record-animation button 162 is pressed again. A user may drag the tag 86 to an initial starting location before the record-animation button 162 is pressed to start recording. This enables the user to set an initial spatial location and temporal location for the tag 86 in the video represented by the scene 84. Pressing the record-animation button 162 again establishes the end spatial location and temporal location of the tag 86. The spatial location of the tag 86 in the video-display area may be described by one or more screen coordinates identifying one or more pixels occupied by the tag 86. For example, the tag location may be specified by the screen coordinates of a center of the tag 86.

For the purposes of the present discussion, the combination of an initial spatial location and a temporal location is called an in point. The combination of an end spatial location and temporal location for a tag in a tag animation is called an out point.

To play test the animation, the play animation button 166 is pressed. The animation interface 160 will then show the tag 86 moving to the tag-resting space 88 as the video scene 84 is played back. To start over and re-record the tag animation, the reset-animation button 168 is selected. To save the animation, the save-animation button 164 is pressed.

From the animation interface, a user may transition to the authoring interface 120 of FIG. 5 by selecting an edit button 176. Selection of a return-to-playback button 178 activates the playback interface 80 of FIG. 4, where a user may view the entire video and accompanying tag animation.

Using the animation interface 160, a user may record so-called multiple in points and out points. To record multiple animations for a tag in a video, a user may selectively toggle the record-animation button 162. For example, a user may record a first animation by pressing the record-animation button 162. The recording is ended by pressing the record-animation button 162 again. After the record-animation button 162 is pressed to stop recording, the scene 84 may continue to play. The user may then reposition the tag 86 as desired as the scene 84 plays to set another in point. When the tag 86 is positioned at a desired in point (which may be set while the scene 84 is playing in slow motion or not), the record-animation button 162 may be pressed again to record another animation. Note that a video scene may be paused, fast-forwarded, rewound, and so on, (e.g., via controls 87) as needed to facilitate establishing desired animation in points, out points, and movement.

Additional or fewer controls 174 may be provided in the animation interface 160 without departing from the scope of the present invention. For example, the help button 172 may be omitted. In addition, the various controls 174 may appear in different forms, other than buttons. For example, the controls 174 may appear as menu items that are accessible in a pop-up list, a pull down menu, tabs, a menu activated by double-clicking or right-clicking the tag 86, and so on.

Hence, the interfaces 80, 120, 160 of FIGS. 4-6 may be employed by the video-tag-handling systems 10, 10 ', 10" of FIGS. 1-3 to facilitate editing, authoring, and animating video tags in a video. The interfaces 80, 120, 160 of FIGS. 4-6 represent different interface screens that are used during different operational modes, including a playback mode, an authoring mode, and an animating mode, respectively.

While such modes are implemented via separate interfaces 80, 120, 160, in FIGS. 4-6, functionality of one or more of the interfaces 80, 120, 160 may be combined or integrated into a single interface screen without departing from the scope of the present teachings. For example, a combined interface could use a system of tabs or drop-down menus to switch between functional modes.

As another example, additional playback and animation controls may be added to the authoring interface 120 of FIG. 5, or additional playback and authoring controls may be added to the animation interface 160 of FIG. 6.

Figure 7:
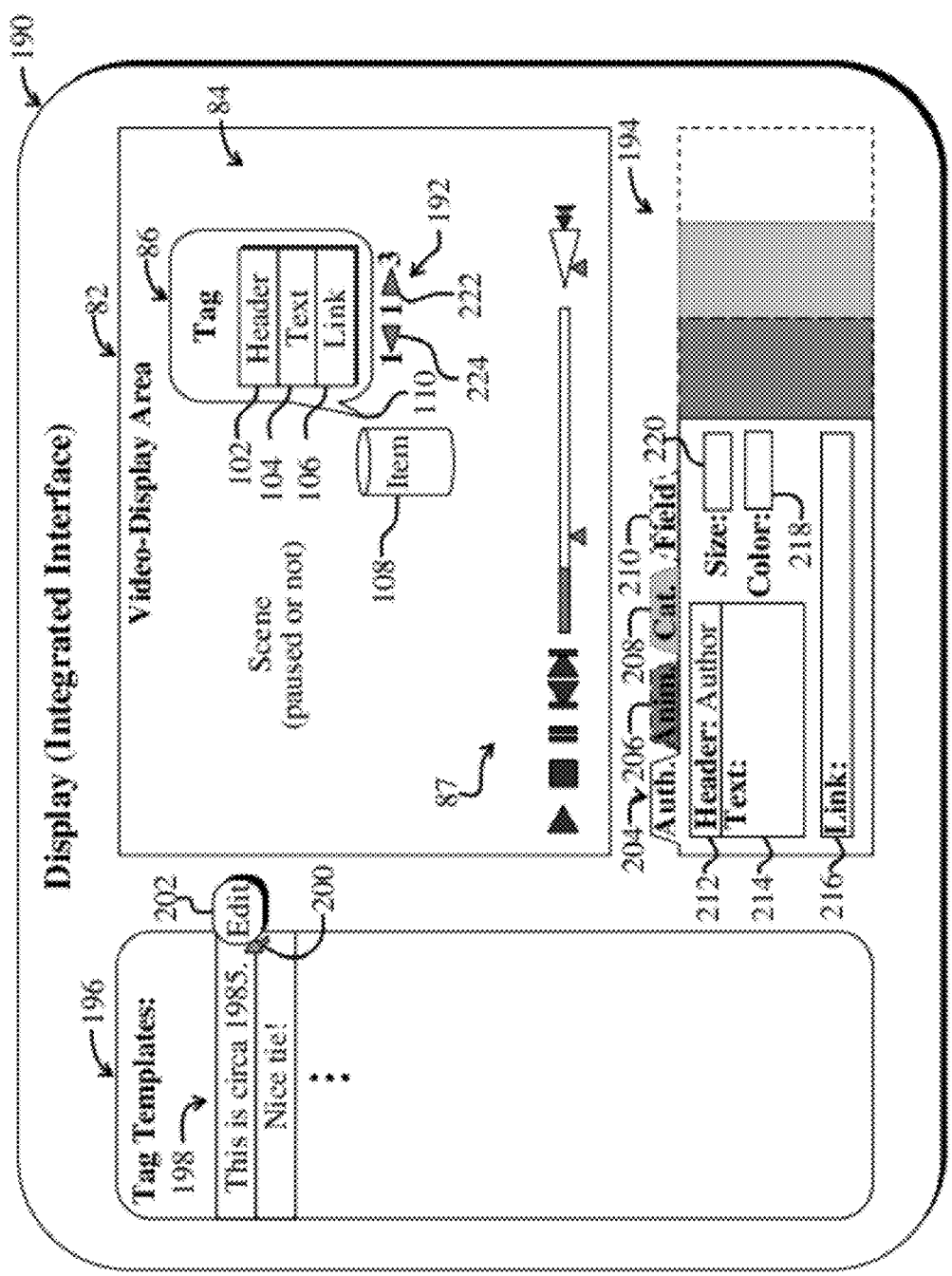
FIG. 7 illustrates a second video-tag authoring interface, which is suitable for use with the video-tag-handling systems of FIGS. 1-3, and enables users to author, edit, and animate video tags.

FIG. 7 illustrates a second video-tag authoring interface 190, also called the integrated interface, which is suitable for use with the video-tag-handling systems 10, 10', 10" of FIGS. 1-3, and enables users to author, edit, and animate video tags. The integrated interface 190 includes the display area 82, which is shown displaying the scene 84. Additional video transport controls 192 are shown overlaying the scene 84 near the tag 86. A set of tabs 194 is positioned below the video-display area 82. A list of tag templates 196 is positioned adjacent to the video-display area 82.

The tag templates 196 include various predefined tags 198, which may be selected, such as via a computer mouse 200. Upon selection of one of the bubble templates 198, a corresponding edit button 202 (or other control) appears. Selecting the edit button 202 causes the contents of the tag template 196 to appear in the tag 86 and in the tabs 194 below the video-display area 82. The user may then employ the tabs 194 to edit tag content, including animation behavior.

For illustrative purposes, the tabs 194 include an authoring tab 204, an animation tab 206, a category tab 208, and a field tab 210. The authoring tab 204 includes fields for facilitating editing tab contents, including a header field 212, a text field 214, a link field 216, text-size field 220, and a text-color field 218.

The animation tab 206 may include various controls for facilitating recording a tag animation. The controls may include animation controls similar to the animation controls 174 of the animation interface 160 of FIG. 6.

The category tab 208 may include various controls for enabling a user to specify a tag category or to otherwise classify the tag 86. The field category 210 may include one or more controls for enabling a user to create new tag fields, such as a tag-author identification field. New tag fields may be included in the tag 86 or adjacent to the tag.

The video transport controls 192 may enable a user to move to different instances of the tag 86 occurring in different portions of the video associated with the scene 84. For example, the video transport controls 192 show that three different versions of the tag 86 exists, as indicated by the right most number of the transport controls 192. The currently displayed version of the tag is "version 1" as indicated by the center number in the video transport controls 192. A user may jump to a second version of the tag 86 by selecting a right arrow 222 occurring in the video transport controls 192. Similarly, a user may transition to any previous version of the tag 86 by selecting a left arrow 224. As the displayed version of the tag 86 changes, the accompanying scene 84 changes accordingly. This enables a user to set different tag parameters or characteristics, such as transparency and color, via one or more controls provided via the tabs 194, in response to different scenes 84 in which the tag 86 occurs.

For the purposes of the present discussion, video transport controls may be any features or underlying functionality associated with a display interface that enable a user to move to different frames in a video to adjust characteristics of a video tag at those different frames or ranges of frames in the video.

Note that additional tabs may be included in the tabs 194 for providing other types of functionality. For example, a tag-shape-selector tab may be included, which provides controls for enabling a user to select different shapes of tags. Additional controls may also be included. For example, controls enabling importing of additional tags to be included in the tag templates 196 may be included in one of the tabs 194 or elsewhere in the integrated interface 190. Additional controls enabling a user to control positioning and/or other properties of the pointer 110, such as whether the pointer 110 is even displayed, may be included in the tabs 194 or in one or more additional tabs.

Figure 8:
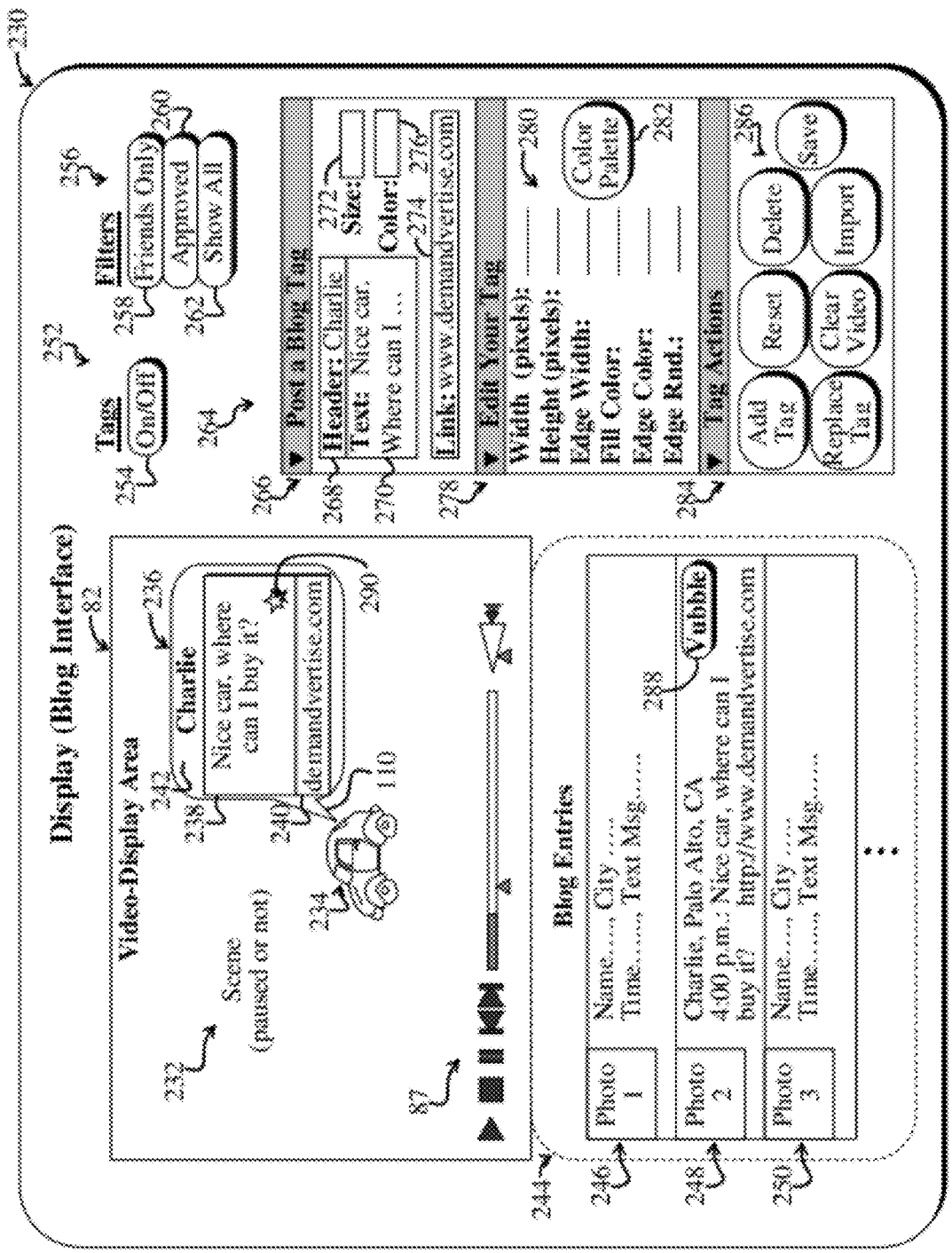
FIG. 8 illustrates a third video-tag authoring interface, interface, which is suitable for use with the video-tag-handling systems of FIGS. 1-3, and is adapted for use with blogging applications.

FIG. 8 illustrates a third video-tag authoring interface 230, which is suitable for use with the video-tag-handling systems 10, 10', 10" of FIGS. 1-3, and that is adapted for use with blogging applications. The third video-tag authoring interface 230, also called the blog interface, includes the video-display area 82 with the playback controls 87. The video-display area 82 shows an example scene 232 with an example tag 236 pointing to a car 234. The tag pointer 110 is positioned on the tag 236 to indicate a desired pointing direction. The pointer 110 may be omitted or replaced with another directional indicator without departing from the scope of the present teachings. For example, instead of using the protruding pointer 110, a portion of the edge of the tag 236 may change color to indicate a desired pointing direction. The tag 236 further includes a text field 238 with example text, an example link field 240 with example URL information, and a header field 242 indicating the author of the tag 236.

The blog interface 230 further includes a blog-entry section 244, which includes various example blog entries 246-250, including a first blog entry 246, a second blog entry 248, and a third blog entry 250. The blog interface 230 further includes tag controls 252, including an on/off control 254 for enabling or disabling the display of tags, such as the tag 236 with the video scene 232. Tag filter controls 256 include a friends-only control 258, an approved control 260, and a show-all control 262. The friends-only control 258 activates one or more routines to enable display of only tags created by friends of the user of the blog interface 230. Similarly, the approved control 260 may activate functionality to enable display of only tags that were created by approved authors or otherwise belong to approved categories or classes of tags. The show-all control 262 may enable a user to show all available or displayable tags on the video-display area 82.

The blog interface 230 further includes various drop down panels 264, which may be expanded or collapsed. For illustrative purposes, the drop down panels 264 are shown expanded. However, in practice, the drop down panels 264 may be selectively collapsed to save space. In certain implementations, only one of the drop down panels 264 is allowed to be expanded at any given time to conserve space. The drop down panels 264 includes a tag-content panel 266, a tag-properties panel 278, and a tag-actions panel 284.

The tag-content panel 266 includes various authoring fields including a header field 268 for entering tag header information, a text field 270 for entering tag text, a link field 274 for entering a desired tag hyperlink, a size field 272 for adjusting tag text size, and a color field 276 for adjusting tag text color.

The tag-properties panel 278 includes various properties fields 280 for adjusting tag width, height, edge width, fill color, edge color, and degree to which edges of the tag 236 are rounded. A color palette for selecting colors may be activated by selecting a color palette button 282. Alternatively, a color palette may automatically appear when a user begins to enter color information into the tag-properties panel 278.

The tag-actions panel 284 includes various controls 286 for controlling tag actions, such as adding, deleting, importing, replacing, clearing, saving, and resetting tags in the scene 232. Additional or fewer controls in each drop down panel 266, 278, 284, and additional or fewer drop down panels may be employed without departing from the scope of the present teachings. For example, additional controls may be added to the tag-actions panel 284 to enable users to control tag animation path, animation duration, category, and so on. As another example, an additional tag-collision-settings panel may be included in the blog interface 230. The tag-collisions-settings panel could include controls for determining which tags are displayed in the event of tag collisions. A tag collision is said to occur when two or more tags overlap or are otherwise configured to share a spatial and temporal location in the video scene 232. Certain categories of tags may be assigned higher collision priorities than other categories of tags. Tags with higher collision priorities may be displayed before tags with lower collision priorities.

The video-tag module 56 of FIG. 1 may be employed to implement collision detection. Alternatively, a client-side plug-in, such as a plug-in corresponding to the playback module 32 may be employed to implement collision-detection methods, such as methods for prioritizing tags and determining collision behavior based on priorities associated with tags involved in a collision; for adjusting tag display duration based on prioritization; for adjusting lifespan of tag in terms of numbers of plays based on prioritization; and/or for otherwise employing tag categories or other priority schemes to control tag population in a video display.

Additional controls, which may be included in an additional panel, may enable adjusting the orientation of the tag pointer 110. Such a control could provide a field to enable a user to indicate which corner or side of the tag 236 from which to extend a pointer.

For illustrative purposes, the blog entries 246-250 are shown including user photos and blog text entries. For the purposes of the present discussion, a blog entry may be any input published by a user to a website or other site that enables other users to publish their input. The second blog entry 248 is shown corresponding the tag 236. A corresponding tag button 288 enables a reader of the second blog entry 248 to cause the scene 232 to jump to the video location where the tag 236 can be viewed. Similarly, the tag 236 may include functionality enabling a user to quickly locate the blog entry 248 corresponding to the tag 236. Such functionality may be implemented via a drop down menu activated by right-clicking the tag 236 or via another method, such as a button or link included in the tag 236.

In one operative scenario, the scene 232 is paused, and the tag 236 is positioned in the scene 232, such as by dragging via a computer mouse. The user then enters or sets desired tag content, properties, and/or characteristics via the drop down panels 264. The duration during which the tag 236 is to be displayed in the scene 232 may be automatically set based on predetermined criteria. For example, relatively large tags may be automatically set to expire sooner than smaller tags with less text. An advertisement tag may persist depending upon the amount paid for the advertisement.

In certain implementations, the tag 236 could persist for only a single video frame. To read the contents of the tag, a user would select the tag button 288 occurring in the corresponding blog entry 248. The tag button 288 would then cause the scene 232 to jump to the frame where the user of the interface can observe the tag 236. Alternatively, the tag 236 may persist for a certain time to enable viewers to read the tag 236 while the scene 232 is playing. Exact details pertaining to tag animation and persistence are application-specific and may be readily determined by those skilled in the art with access to the present teachings to meet the needs of a given application.

In other implementations, the tag 236 may be specifically animated 236 in the scene 232. For example, a user could create multiple in and out points and intermediate points for animating the tag 236 by using the playback controls 86. For example, a user could move the tag 236 to a first position; then advance the video via the playback controls 86; move the tag to the next desired location; then advance the scene 232 again, and so on. A save or enter button included in the tag actions panel 284 may be selected to terminate the tag recording, thereby creating an animation out point.

In some cases, users may wish to enter lengthy text in the tag 236. The amount of text that a user may enter may be limited based on predetermined criteria, such as tag size or priority. Alternatively, scrolling features may be added to the tag 236 to enable a user to scroll through the tag text 238 in cases where the text 238 is lengthy.

Computer routines for implementing the blog interface 230 may be implemented via various modules 24-34 running on the tag-authoring computer 14 of FIG. 1 as Internet browser plug-ins. Alternatively, some or all of the routines may be implemented via software and/or hardware running on the social-networking site 18 or other locations. The exact location of the routines may be immaterial for certain implementations.

With reference to FIGS. 1 and 8, in the present operative scenario, the tag 236 is shown including text 238 referencing a car 234 in the scene 232 and asking where the car 234 can be purchased. Before this text 238 is published, the text 238 is transferred to the tag server 16 of FIG. 1. The tag server 16 then adjusts the text 238 if needed, and performs any calculations or observations. In the present scenario, software running on the tag server 16 notes the spatial and temporal location (or range of locations) in the video scene 232 at which the tag 236 occurs and notes that the text 238 refers to a car. The tag server 16 may run artificial intelligence (AI) software adapted to determine that the text asks a question.

The AI software may then provide an answer to the question in a tag field, button, and/or hyperlink.

In the present operative scenario, the tag server 16 determines that the tag 236 refers to a car and stores corresponding statistics information in the video-tag usage database 50. The tag server 16 then automatically inserts a link 290 into the tag 236 before the tag is published. The link 290 may direct users to an advertiser's website where users can purchase cars. User selection of the link 290 may cause a signal to be sent to the tag server 16 to indicate that a user has selected the link 290. Alternatively, the user may be transferred to a site hosted by the tag server 16, where a user can then access another website where they can purchase automobiles, such as the car 234. Alternatively, the link 290 refers to an e-commerce website implemented via the e-commerce engine 52 of the tag server 16.

The statistics information pertaining to the tag 236 may include, for example, where and when the tag 236 occurs in the scene 232 and what the tag text 238 discusses. The tag controller 38 running on the tag server 16 of FIG. 1 may employ the statistics to place additional relevant tags, tag links, advertisements, and so on in the video scene 232 at desired locations.

As users add tags and blog entries to the video scene 232, the tag server 16 obtains additional information about the corresponding video. This additional information is usable for business purposes, such as advertising.

Figure 9:
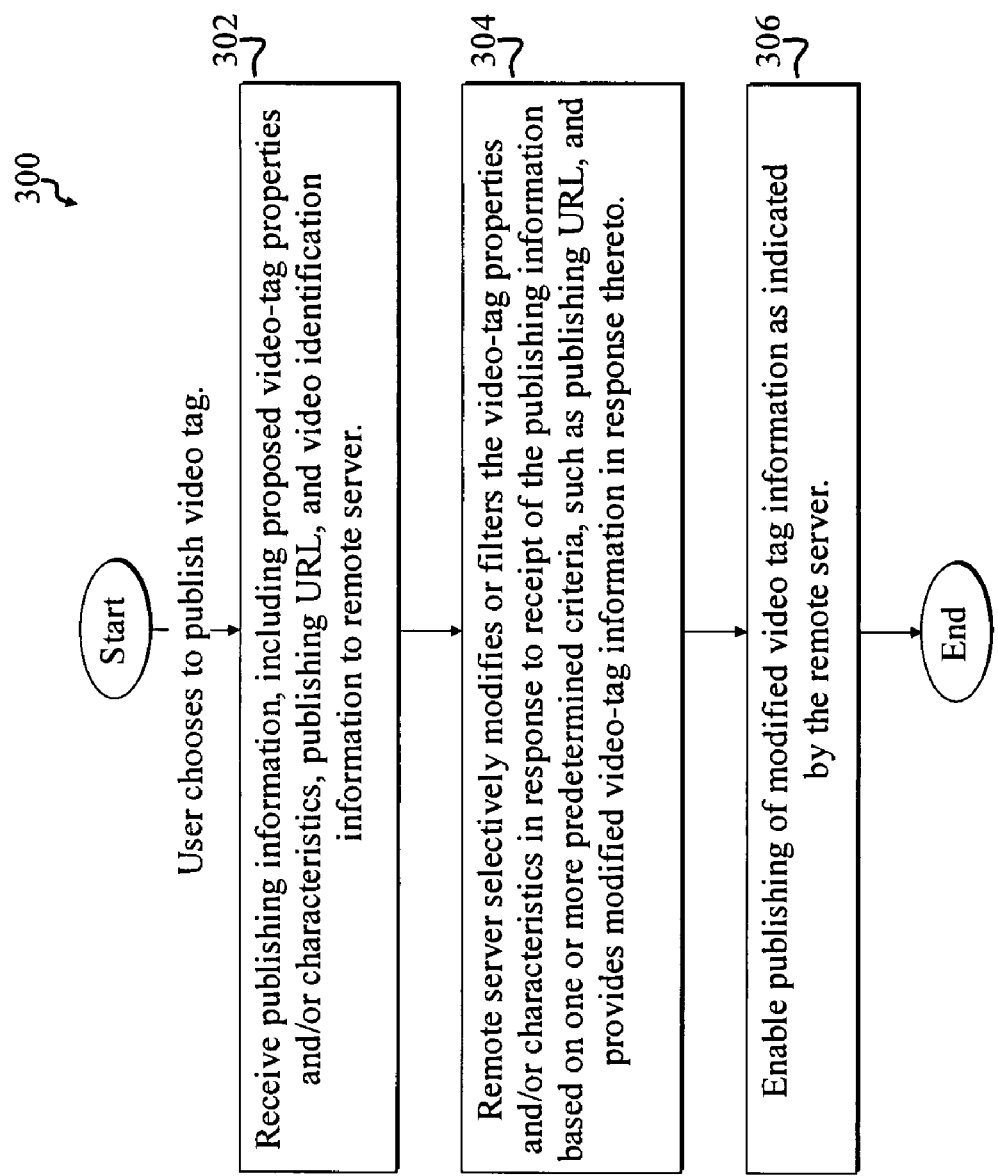
FIG. 9 is a flow diagram of a first method suitable for use with the video-tag-handling systems and interfaces of FIGS. 1-8.

FIG. 9 is a first example flow diagram of a method 300 suitable for use with the video-tag-handling systems 10, 10', 10" of FIGS. 1-3 and interfaces 80, 120, 160, 190, 230 of FIGS. 4-8. The method 300 includes a first step 302, which includes employing a server, such as the remote tag server 16 of FIG. 1 to receive publishing information, including proposed video-tag properties and/or characteristics, publishing URL, and video identification information.

A second step 304 includes employing the server to selectively modify or filter publishing information, such as the video-tag properties and/or characteristics, in response to receipt of the publishing information based on one or more predetermined criteria, such as publishing URL. The server then provides resulting modified video-tag information.

A third step 306 involves enabling publishing of the modified video-tag information, such as by providing an enabling signal and accompanying modified video-tag information to one or more websites or applications as needed.

Figure 10:
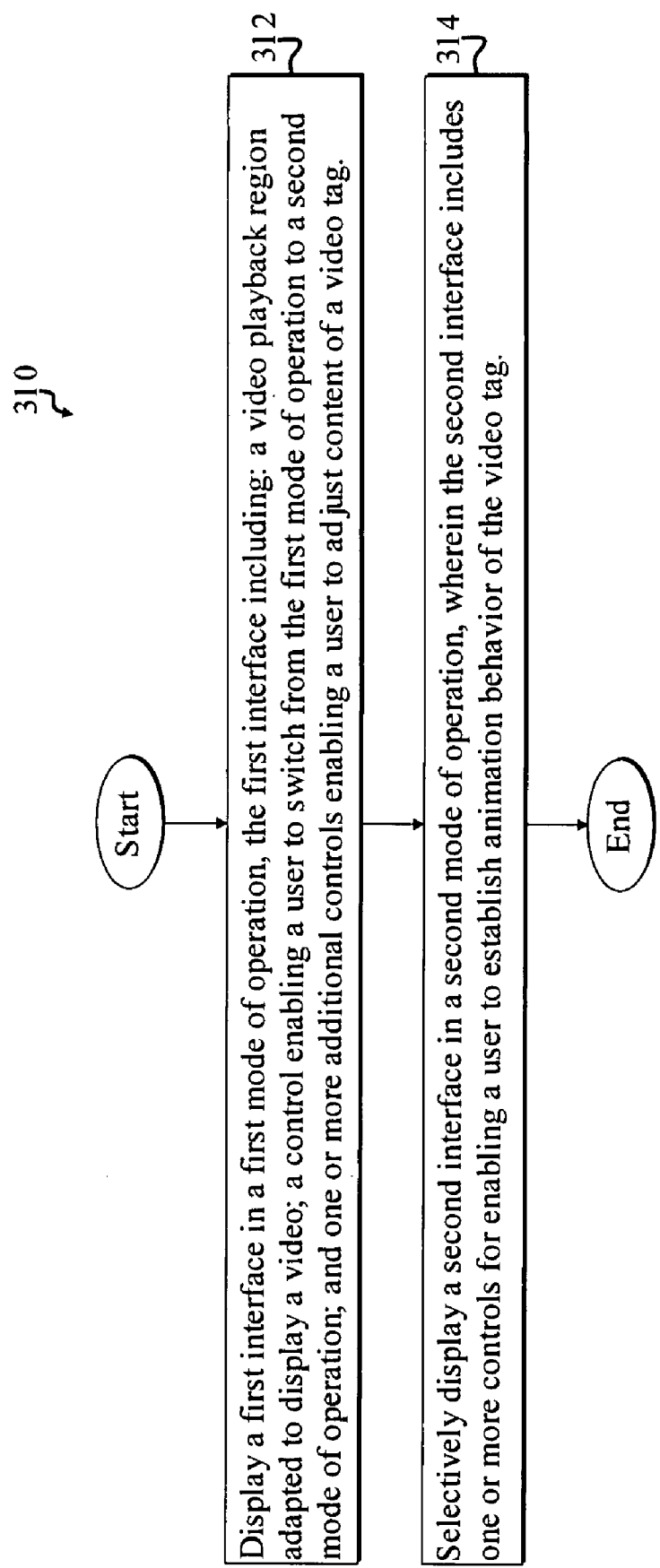
FIG. 10 is a flow diagram of a second method suitable for use with the video-tag-handling systems and interfaces of FIGS. 1-8.

FIG. 10 is a second example flow diagram of a method 310 suitable for use with the video-tag-handling systems 10, 10', 10" of FIGS. 1-3 and interfaces 80, 120, 160, 190, 230 of FIGS. 4-8. The method 310 includes a first step 312, which includes displaying a first interface in a first mode of operation. The first interface includes a video playback region adapted to display a video; a control enabling a user to switch from the first mode of operation to a second mode of operation; and one or more additional controls enabling a user to adjust content of a video tag.

A subsequent step 314 involves selectively displaying a second interface in a second mode of operation, wherein the second interface includes one or more controls for enabling a user to establish animation behavior of the video tag.

Figure 11:
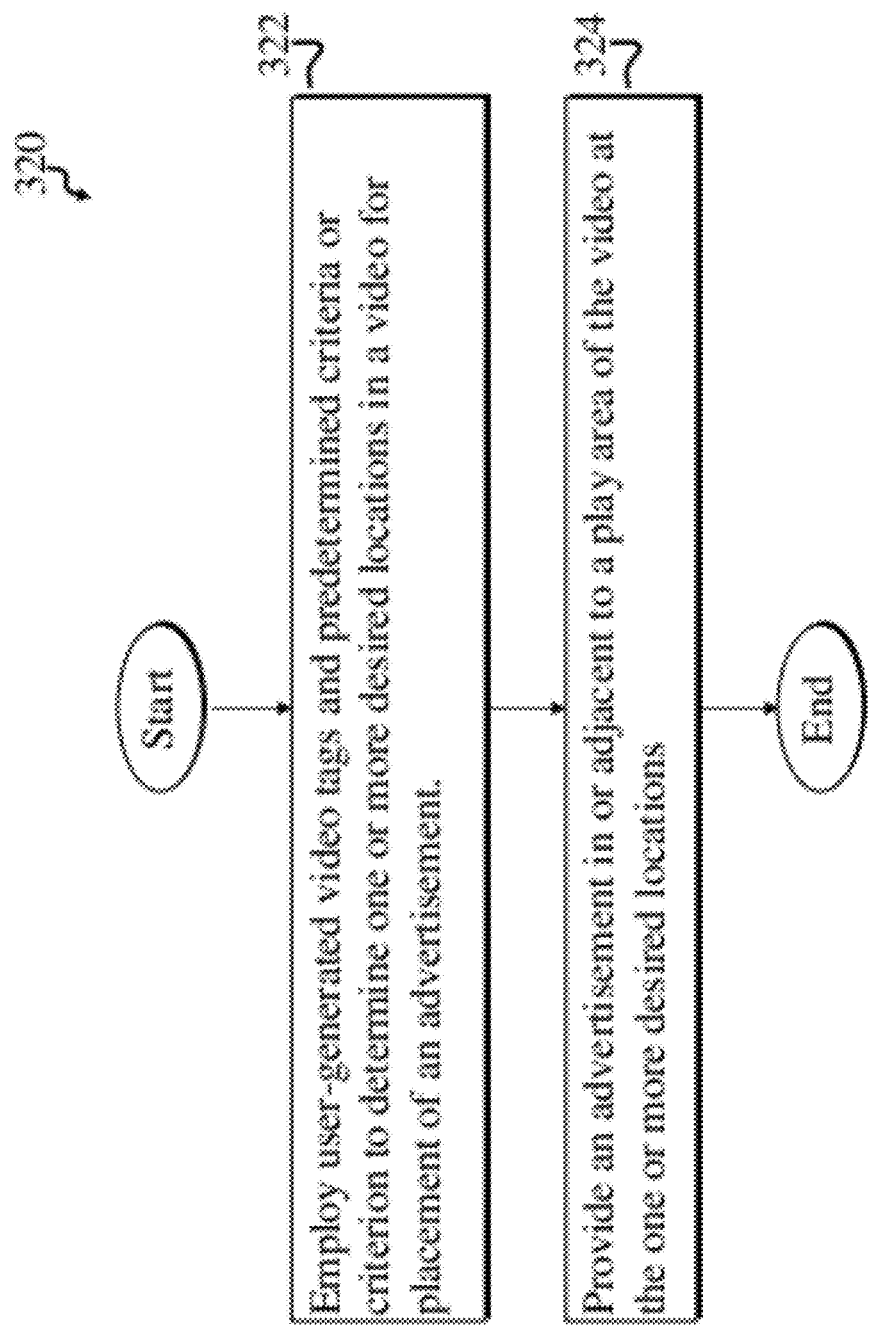
FIG. 11 is a flow diagram of a third method suitable for use with the video-tag-handling systems and interfaces of FIGS. 1-8.

FIG. 11 is a flow diagram of a third method 320 suitable for use with the video-tag-handling systems 10, 10', 10" of FIGS. 1-3 and interfaces 80, 120, 160, 190, 230 of FIGS. 4-8. The third method 320 includes a location-determining step 322, which includes employing user-generated video tags and a predetermined criterion or criteria to determine one or more desired locations in a video for placement of an advertisement. The advertisement is then provided in or adjacent to a play area of the video at the one or more desired locations in an advertisement-placing step 324.

Additional methods suitable for use with the video-tag-handling systems 10, 10', 10" of FIGS. 1-3 and interfaces 80, 120, 160, 190, 230 of FIGS. 4-8 include using the author's predefined text to add information to the video while it is running at a desired time, e.g., when a particular product is showing.

Another method involves determining video playback area boundaries and modifying accompanying tag behavior to account for the boundaries. For example, each of multiple users may be limited to placing a tag only in a predetermined area of a video (or outside of a video). This could prevent users from placing tags that interfere with other users' tags. Also, this could allow a reserved area for placement of non-obscured sponsored tags regardless of the amount of user tags. Another limitation on users can be the size of a tag allowed to be created by a user.

In one embodiment, users that have a higher reputation than other users (e.g., users who have been a member of a website's community for a long time, who have received a higher rating or more votes from other users, etc.) can have greater privileges with respect to posting tags. The higher-rated users can have their tags have a higher priority than lower-rated users. The higher priority tags can overlay or block the lower priority tags. The lower priority tags may be removed if they collide with higher priority tags. Higher-rated users may be allowed to delete tags from lower-rated users. In one social community website embodiment, the user community can cause automatic removal of a tag if the tag receives enough negative votes from the community. Similarly, tags with more positive votes can be granted precedence and may be maintained while other lower-rated tags are removed in order to maintain a reasonable amount of tags on the display at any one time.

Higher-rated users may be allowed to post larger tags, or tags with reserved styles, themes, colors, animations or other desirable or distinctive characteristics. A user may receive a higher rating by paying more money to be a subscribing member of a site, by being awarded a higher rating by an administrator, or by other methods.

In one embodiment of a social networking site, a user is assigned an account to which the user can login by using a username and/or password. Once logged in the user has access to a profile page that includes information about the user and also includes controls for the user to define a look or style to be used in the tags that the user posts to videos. For example, the user can select specific color combinations (background, border, text, etc.), highlights, tag animations (e.g., glowing, vibrating), transitions, text font type, etc. When the user posts a tag to a video the predefined tag characteristics from the user's profile page can be used to determine part of the tag's design.

Another method involves automatically filtering swear words or links that are determined undesirable for a particular application or otherwise controlling tag size based on predetermined criteria.

Another method includes selectively and/or automatically controlling or limiting allowable tag locations and tag size in a video based on where, such as what website, the video and accompanying tags are to be published. For example, videos playing on certain websites may require that tags be confined to a certain region of a video-display area. The method may further involve determining video boundaries associated with a video and adjusting moment of a tag based on the predetermined boundaries.

Another method includes employing tag text to determine when a particular product or item is being displayed in a video and automatically selecting or adding an advertisement based on the particular product or item.

Another method includes filtering or adjusting tag information identifying movement and location of the tag so that the tag does not move outside of a predetermined region based on predetermined criteria. The predetermined criteria may include a publishing URL identifying a website to which the video and tag will be published.

Dataset Format and Use

In a preferred embodiment, a tag's definition within a dataset includes three basic types of characteristics—design, action and content. The design characteristics include visual features such as the size of a tag, the tag's color, shape, opacity, etc. Action characteristics describe a tag's translational movement behavior with respect to a video to which the tag is applied. For example, a description of a tag's appearance ("in point"), movement across a video area while the video is being played back ("path"), and disappearance ("out point") are described as the tag's action characteristics. A tag content characteristic is optional and includes an indication of where or how to get tag information. In a simple text tag that has the appearance of text inside a box or bubble (or merely floating text) the text itself can come from a design characteristic, or text attribute. This is referred to as internal content since the tag's content is included completely within a dataset. Alternatively, external text, symbols, pictures, logos, icons, or other image data can be referenced as an external file or network location so that tags can be created with standard third-party image, audio and graphics programs and used with other characteristics in tag datasets.

Similarly, additional video or audio information can be referenced as tag content so that a tag entry in a dataset can refer to an external source for such information. For example, an external video file can be treated as a tag within a dataset and be made to appear embedded within a primary video. The external video can be subjected to any of the tag characteristics described herein such as action characteristics to allow the external video to be moved about the primary video, changing the design characteristics of the secondary video, etc. Audio voice-over can be handled as a tag so that use of "in" and "out" points controls how the audio is started and stopped while the primary video is playing.

Figure 13:
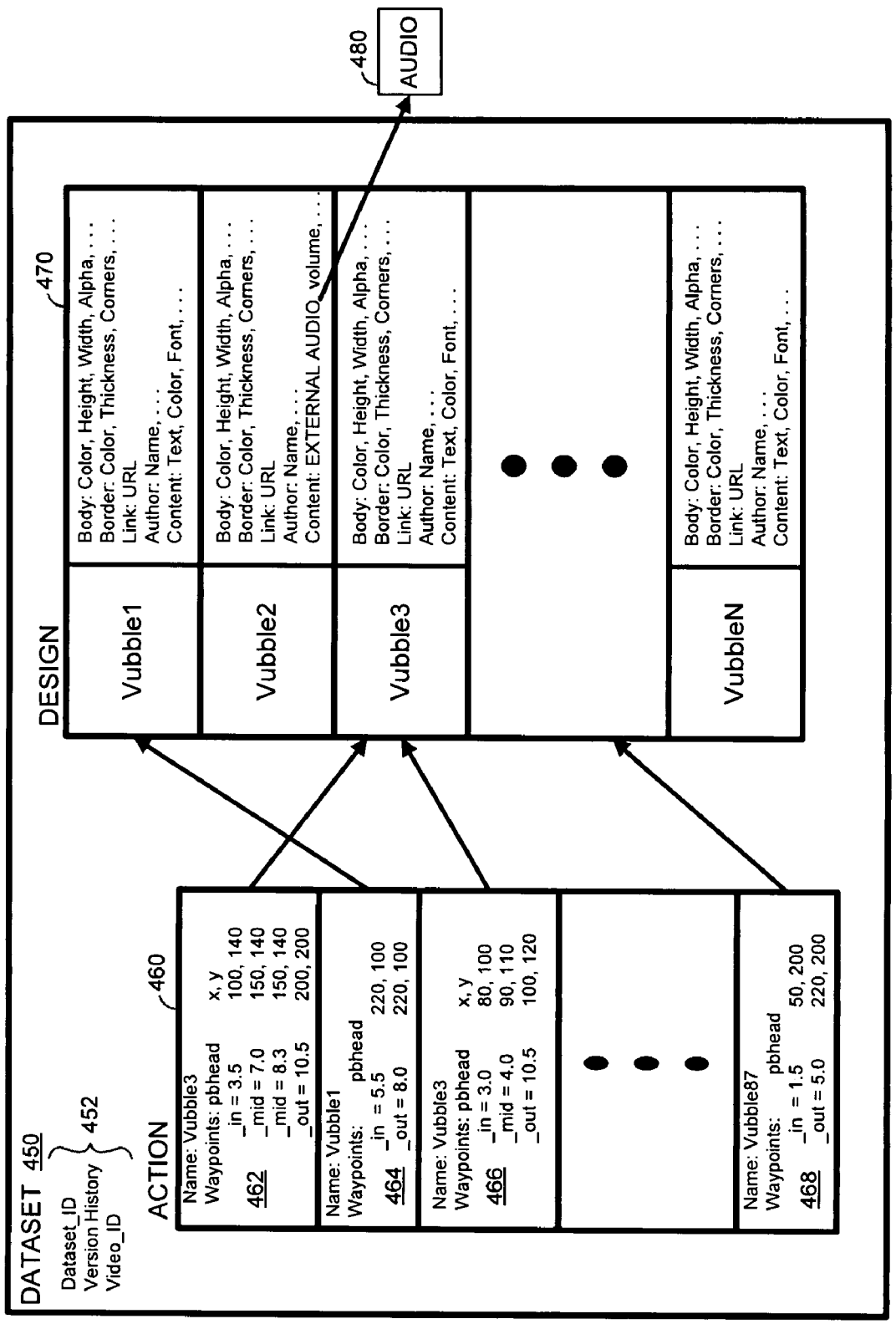
FIG. 13 illustrates an example tag dataset format.

FIG. 13 illustrates an example tag dataset format. It should be apparent that many of the details of such a format are a matter of design choice and may be modified, as desired, without departing from the scope of the invention. Dataset 450 includes global information 452 such as a dataset ID, version history and video ID. The dataset ID and video ID values can be used in a manner described above to associate the dataset with a particular video, or to otherwise allow selection of the dataset by a user, process or other mechanism. In particular embodiments both of the values need not be used, and other information can also be provided to assist with association and selection (e.g., sequence number, security or access permissions or restrictions, etc.). Version history information can include an indication of who created or possesses legal ownership of the dataset, the time and manner of dataset creation and subsequent modification, and other details about the history and maintenance of the dataset.

In a preferred embodiment, a dataset object such as dataset 450 includes two separate structures such as tables or arrays. A first structure is an action table 460 that includes information on characteristics dealing with tag movement. A second structure is a design table 470 that includes information about characteristics dealing with the look or content of a tag. Design table 470 can also include animation information that is not translational such as transitions for appearing and disappearing tags (e.g., fade-in, fade-out, zoom-in, vibrating or bouncing, lighting effects, etc.). Note that the two-table structure and the specific selection and arrangement of values therein represent but one type of organization for the dataset object. It should be apparent that unless otherwise claimed, many variations of data design are possible and may be within the scope of the invention.

Action table 460 includes multiple entries such as entries 462-468. Any number of entries can be used depending on the number of tag appearances and/or movements that take place within a video. Each entry includes a name of a tag to which the appearance and movement described by the entry will apply. For example, entry 462 references a tag named "Vubble3". The tag name is followed by waypoint definitions that specify positions that the tag will occupy in the video area at specific times in the video. Each time is in reference to a "playback head" or "pbhead" time that is maintained by the video playback engine or by an external program or device that can provide such a time reference to the playback engine. The waypoints are presented in a chronological top-down order. For example, entry 462 has a first time value called "pbhead_in" of 3.5 which indicates that at 3.5 seconds after the start of the video the tag Vubble3 first appears at position x=100, y=140. Similarly, the next waypoint shows that at "pbhead_mid" which has a value of 7.0 the tag will be at the x,y position 150, 140. Interpolation routines act to move the tag image from 100,140 at 3.5 seconds to 150, 140 at 7.0 seconds. At 8.3 seconds the tag is at 150, 140 and at 10.5 seconds the tag has been moved to 200, 200 where it is then removed from the display.

Note that other ways to measure playback time are possible. For example, a timer can generate time values. When playback of the video begins the current timer value can be used as the start time of the video. Subsequent times can be relative to the timer or can be calculated relative to the video start time by subtracting the start time from a current time of the timer. Any other suitable way of deriving time values for purposes of synchronizing tags to the video may be used.

Design table 470 shows that the information to draw Vubble3 is included in association with the Vubble3 entry in the design table. Values for body color, body height, body width, body alpha (opacity), etc. can be included. Values for border color, thickness, corner roundness, etc. can also be included along with a link or URL, tag author's name, content characteristics, etc. Design table 470 shows that Vubble3's content is text that is stored in the design table. Characteristics of the text such as color, font, etc., can be provided as values associated with the Vubble3 entry in the design table. Multiple entries in the action table 460 can reference a single entry in the design table as shown where entries 462 and 466 each reference Vubble3 in the design table. This allows multiple appearances and animations of a same tag design to be easily implemented.

The entry Vubble2 in design table 470 shows a content reference for "EXTERNAL AUDIO" to audio object 480. The content reference can be a filename, object name, address, URL or other address or descriptor and may reference an object at a remote location over a digital network such as the Internet. When Vubble2 is referenced by an entry in the action table the external object can be accessed (or it could have been pre-fetched) for download or streaming to play back or otherwise present the external object. Presentation of the external object can be by additional parameters or values included in the design table. For example, external audio object 480 can be played back at a pbhead_in time specified in the action table at a volume setting determined by a value associated with Vubble2 in the design table. Other types of external objects can be referenced and used as tag content. For example, in addition to audio an external object can include video, images, text, animated images, etc.

Although embodiments of the invention are discussed primarily with respect to video publishing, tag authoring, and presentations, any type of visual GUI, publishing system, and playback system can be used to implement features described herein and may be adapted for use with embodiments of the present invention. For example, animations, movies, prestored files, slide shows, Flash™ animation, etc. can be used with features of the invention. The number and type of attributes or other data included in the tag database can vary, as desired.

Many other types of hardware and software platforms can be used to implement the functionality described herein. For example, an authoring system or module can be included in a portable device such as a laptop, personal digital assistant (PDA), cell phone, game console, email device, etc. In such a system or module, various constituent components of the system might be included in a single device. In other approaches, one or more of the components or modules can be separable or remote from the others. For example, tag data can reside on a storage device, server, or other device that is accessed over a network. In general, the functions described herein can be performed by any one or more devices, processes, subsystems, or components, at the same or different times, executing at one or more locations.

Generally, any type of playback device (e.g., computer system, set-top box, DVD player, etc.), image format (Motion Picture Experts Group (MPEG), Quicktime™, audio-visual interleave (AVI), Joint Photographic Experts Group (JPEG), motion JPEG, etc.), display method or device (cathode ray tube, plasma display, liquid crystal display (LCD), light emitting diode (LED) display, organic light emitting display (OLED), electroluminescent, etc.) can be used to implement embodiments of the present invention. Any suitable source can be used to obtain playback content such as a DVD, HD DVD, Blu-ray™ Disc, hard disk drive, video compact disc (CD), fiber optic link, cable connection, radio-frequency transmission, network connection, and so on, may also be used. In general, the audio/visual content, display and playback hardware, content format, delivery mechanism and other components and properties of the system can vary, as desired, and any suitable items and characteristics can be used.

Any specific hardware and software described herein are only presented to provide a basic illustration of but one example of components and subsystems that can be used to achieve certain functionality such as playback of a video. It should be apparent that components and processes can be added to, removed from or modified from those shown in the Figures, or described in the text, herein.

Many variations are possible and many different types of DVD players or other systems for presenting audio/visual content can be used to implement the functionality described herein. For example, a video player can be included in a portable device such as a laptop, PDA, cell phone, game console, e-mail device, etc. The tag data, i.e., video-tag data can reside on a storage device, server, or other device that is accessed over another network. In general, the functions described can be performed by any one or more devices, processes, subsystems, or components, at the same or different times, executing at one or more locations.

Accordingly, particular embodiments can provide for authoring and/or publishing tags in a video. The video can be played back via a computer, DVD player, or other device. The playback device may support automatically capturing of screen snapshots in the accommodation of tag information outside of a video play area. Further, while particular examples have been described herein, other structures, arrangements, and/or approaches can be utilized in particular embodiments. The formats for input and output video can be of any suitable type.

Any suitable programming language can be used to implement features of the present invention including, e.g., Flash, Actionscript, C, C++, Java, Javascript, PL/I, assembly language, etc. Different programming techniques can be employed such as procedural or object oriented. The routines can execute on a single processing device or multiple processors. The order of operations described herein can be changed. Multiple steps can be performed at the same time. The flowchart sequence can be interrupted. The routines can operate in an operating system environment or as stand-alone routines occupying all, or a substantial part, of the system processing.

Steps can be performed by hardware or software, as desired. Note that steps can be added to, taken from or modified from the steps in the flowcharts presented in this specification without deviating from the scope of the invention. In general, the flowcharts are only used to indicate one possible sequence of basic operations to achieve a function.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear. [166] As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiments disclosed, including the best mode or preferred embodiment(s) contemplated for carrying out this invention, but that the invention will include any and all embodiments and equivalents falling within the scope of the appended claims.

What is claimed is:

1. A method comprising:
    obtaining an identification corresponding to a video;
    receiving, based at least in part on the identification, an associated dataset from a location over a digital network, wherein the associated dataset includes:
        display information describing visual design and placement of additional content at predetermined locations that, in response to playback of the video, overlap at least a portion of displayed video content to annotate items depicted within the displayed video content; and
        synchronization information for displaying the additional content at predetermined times in response to playback of the video;
    transferring the associated dataset to a playback engine for synchronized playback of at least a portion of the additional content with the video according to at least a portion of the synchronization information;
    accepting a first modification to the associated dataset by a first user to produce a first modified dataset;
    accepting a second modification to the first modified dataset by a second user to produce a second modified dataset, the second modification including a modification to the display information, to the synchronization information, or to both the display information and the synchronization information; and
    transferring the second modified dataset to the playback engine for synchronized playback, with the video, of at least a portion of the additional content in accordance with information in the second modified dataset.

2. The method of claim 1, wherein obtaining the identification comprises:
    obtaining a predetermined identification corresponding to the video.

3. The method of claim 1, wherein obtaining the identification comprises:
    obtaining a predetermined identification embedded with a video file.

4. The method of claim 1, wherein obtaining the identification comprises:
    obtaining a predetermined identification embedded with a video stream.

5. The method of claim 1, further comprising:
    deriving the identification, at least in part, from data that includes at least a portion of the video.

6. The method of claim 5, wherein deriving the identification comprises:
    generating a hash value from the data.

7. The method of claim 5, wherein deriving the identification comprises:
    comparing multiple values in the data with multiple predetermined expected values.

8. The method of claim 7, further comprising:
    determining whether a statistical criterion is met based on the comparing multiple values in the data with the multiple predetermined expected values.

9. The method of claim 8, wherein determining whether the statistical criterion is met comprises:
    determining whether a threshold percentage of expected values at predetermined locations in the data is met.

10. The method of claim 1, wherein obtaining the identification comprises:
accepting a signal from a user input device; and
obtaining the identification based at least in part on the signal from the user input device.

11. The method of claim 10, wherein obtaining the identification based at least in part on the signal from the user input device comprises:
determining, in response to the signal, a filename.

12. The method of claim 11, wherein accepting a signal from a user input device comprises accepting a signal that identifies the video and determining the filename comprises determining a filename associated with the video.

13. The method of claim 11, wherein determining the filename comprises:
identifying the associated dataset corresponding to the filename.

14. The method of claim 1, wherein receiving, based at least in part on the identification, the associated dataset comprises:
receiving multiple associated datasets configured to provide the additional content in synchronization with playback of the video.

15. The method of claim 1, further comprising:
obtaining the video over the digital network.

16. The method of claim 1, wherein obtaining the identification comprises:
obtaining a predetermined identification representing a listing in a directory structure readable by humans or automated processes.

17. The method of claim 1, wherein obtaining the identification comprises:
obtaining a predetermined identification representing a binary value.

18. An apparatus comprising:
a hardware processor;
a machine-readable storage medium including one or more instructions executable by the hardware processor that configure the hardware processor to:
obtain an identification corresponding to a video;
receive, based at least in part on the identification, an associated dataset from a location over a digital network, wherein the associated dataset includes:
display information describing visual design and placement of additional content at predetermined locations that, in response to playback of the video, overlap at least a portion of displayed video content to annotate items depicted within the displayed video content; and
synchronization information for displaying the additional content at predetermined times in response to playback of the video;
transfer the associated dataset to a playback engine for synchronized playback of the additional content with the video
accept a first modification to the associated dataset by a first user to produce a first modified dataset;
accept a second modification to the first modified dataset by a second user to produce a second modified dataset, the second modification including a modification to the display information, to the synchronization information, or to both the display information and the synchronization information; and
transfer the second modified dataset to the playback engine for synchronized playback, with the video, of at least a portion of the additional content in accordance with information in the second modified dataset.

19. A non-transitory machine-readable storage medium including instructions executable by a hardware processor, the instructions comprising:
instructions to obtain an identification corresponding to a video;
instructions to receive, based at least in part on the identification, an associated dataset from a location over a digital network, wherein the associated dataset includes:
display information describing visual design and placement of additional content at predetermined locations that, in response to playback of the video, overlap at least a portion of displayed video content to annotate items depicted within the displayed video content; and
synchronization information for displaying the additional content at predetermined times in response to playback of the video;
instructions to transfer the associated dataset to a playback engine for synchronized playback of the additional content with the video;
instructions to accept a first modification to the associated dataset by a first user to produce a first modified dataset;
instructions to accept a second modification to the first modified dataset by a second user to produce a second modified dataset, the second modification including a modification to the display information, to the synchronization information, or to both the display information and the synchronization information; and
instructions to transfer the second modified dataset to the playback engine for synchronized playback, with the video, of at least a portion of the additional content in accordance with information in the second modified dataset.

* * * * *

UNITED STATES PATENT AND TRADEMARK OFFICE
CERTIFICATE OF CORRECTION

PATENT NO. : 8,285,121 B2  
APPLICATION NO. : 11/868522  
DATED : October 9, 2012  
INVENTOR(S) : Kulas Page 1 of 1

It is certified that error appears in the above-identified patent and that said Letters Patent is hereby corrected as shown below:

In the Specification

In Column 1, Line 10, delete "PLAYBACK.,"" and insert -- PLAYBACK," --, therefor.

In Column 27, Lines 37-43, delete "[166] As used..........otherwise." and insert -- As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise. --, therefor at Line 38, as a new paragraph.

In the Claims

In Column 30, Line 3, in Claim 18, delete "video" and insert -- video; --, therefor.

Signed and Sealed this  
Eleventh Day of June, 2013

Teresa Stanek Rea  
*Acting Director of the United States Patent and Trademark Office*